(12) United States Patent
Brown et al.

(10) Patent No.: US 9,045,243 B2
(45) Date of Patent: Jun. 2, 2015

(54) APPARATUS AND METHOD FOR STACKING CORRUGATED SHEET MATERIAL

(75) Inventors: Kevin P. Brown, Nine Mile Falls, WA (US); Craig H. Gendreau, Spokane, WA (US); Curtis A. Roth, Post Falls, ID (US); Lynn E. Vershum, Coeur d'Alene, ID (US)

(73) Assignee: J&L Group International, LLC, Keithville, LA (US)

( * ) Notice: Subject to any disclaimer, the term of this patent is extended or adjusted under 35 U.S.C. 154(b) by 94 days.

(21) Appl. No.: 13/566,278

(22) Filed: Aug. 3, 2012

(65) Prior Publication Data

US 2013/0074457 A1 Mar. 28, 2013

Related U.S. Application Data

(60) Provisional application No. 61/515,189, filed on Aug. 4, 2011.

(51) Int. Cl.
*B65B 11/00* (2006.01)
*G03G 15/00* (2006.01)
(Continued)

(52) U.S. Cl.
CPC ...... *B65B 11/00* (2013.01); *G03G 2215/00016* (2013.01); *G03G 15/6529* (2013.01); *B65G 57/24* (2013.01); *B65G 57/00* (2013.01); *G03G 2215/00561* (2013.01); *B65H 29/18* (2013.01); *B65H 31/3081* (2013.01); *B65H 31/32* (2013.01); *B65H 33/16* (2013.01);
(Continued)

(58) Field of Classification Search
USPC ...... 198/586, 597, 312, 463.2, 584; 271/189, 213, 214, 218; 29/564, 563; 361/728, 729; 399/110; 414/788, 414/788.1, 789.5, 789.9, 790, 790.1, 790.3, 414/790.6, 790.7, 790.8, 793.8, 794.1, 414/795.8; 52/36.1, 749.1; 493/479; 436/47, 48; 422/63, 65; 248/646, 647, 248/649, 662, 671
See application file for complete search history.

(56) References Cited

U.S. PATENT DOCUMENTS 1,521,820 A * 1/1925 Lloyd ........................ 414/329
1,752,648 A   4/1930 Matthews
(Continued)

FOREIGN PATENT DOCUMENTS

CA     1319161      6/1993
DE     21 14 865    10/1972
(Continued)

*Primary Examiner* — Gregory Adams
(74) *Attorney, Agent, or Firm* — Dorsey & Whitney LLP

(57) ABSTRACT

An apparatus for stacking sheet material that may include a trim section and a stacking section, the stacking section being downstream the trim section for receiving the blanks of sheet material, forming bundles each having a plurality of blanks, and transferring the bundles downstream. The apparatus may further include a plurality of longitudinal positioning systems for independently longitudinally positioning a plurality of components in at least one of upstream or downstream directions so as to create an operator access space. In some embodiments, the apparatus may further include an incline conveyor section downstream the trim section and upstream the stacking section, and the trim section may have a takeaway conveyor for conveying the plurality of blanks of sheet material to the incline conveyor. In certain embodiments, the plurality of longitudinal positioning systems can individually longitudinally position at least two of the takeaway conveyor, the incline conveyor, or the stacking apparatus.

22 Claims, 17 Drawing Sheets

(51) Int. Cl.
    *B65H 29/18*    (2006.01)
    *B65H 31/30*    (2006.01)
    *B65H 31/32*    (2006.01)
    *B65H 33/16*    (2006.01)
    *B65G 57/24*    (2006.01)
    *B65G 57/00*    (2006.01)

(52) U.S. Cl.
    CPC ......... *B65H2402/32* (2013.01); *B65H 2402/40* (2013.01); *B65H 2601/11* (2013.01); *B65H 2601/321* (2013.01); *B65H 2701/1764* (2013.01); *B65H 2801/42* (2013.01)

(56) References Cited

U.S. PATENT DOCUMENTS

| | | | |
|---|---|---|---|
| 2,467,423 A | 4/1949 | Bruker | |
| 2,937,739 A | 5/1960 | Levy | |
| 3,189,342 A | 6/1965 | Bocock | |
| 3,507,489 A | 4/1970 | Wilshin et al. | |
| 3,729,188 A | 4/1973 | Stephenson | |
| 3,892,168 A | 7/1975 | Grobman | |
| 4,073,223 A | 2/1978 | Crawford | |
| 4,189,965 A | 2/1980 | Kollann | |
| 4,373,713 A | 2/1983 | Loebach | |
| 4,385,537 A | 5/1983 | Wolf | |
| 4,486,012 A | 12/1984 | Bock et al. | |
| 4,691,914 A | 9/1987 | Lawrence | |
| 4,765,790 A * | 8/1988 | Besemann | 414/790.4 |
| 4,900,297 A * | 2/1990 | Frost et al. | 493/82 |
| 4,934,687 A * | 6/1990 | Hayden et al. | 271/202 |
| 4,966,521 A | 10/1990 | Frye et al. | |
| 4,977,828 A | 12/1990 | Douglas | |
| 5,026,249 A | 6/1991 | Shill | |
| 5,129,643 A | 7/1992 | Johnson et al. | |
| 5,160,129 A * | 11/1992 | Siriporn et al. | 271/178 |
| 5,316,286 A | 5/1994 | Takimoto | |
| 5,366,217 A | 11/1994 | Tokuno et al. | |
| 5,545,001 A * | 8/1996 | Capdeboscq | 414/790.8 |
| 5,702,100 A | 12/1997 | Novick et al. | |
| 5,904,465 A | 5/1999 | Fernandez | |
| 5,938,191 A | 8/1999 | Morrison et al. | |
| 5,950,510 A | 9/1999 | Scheffer et al. | |
| 6,000,531 A | 12/1999 | Martin | |
| 6,129,503 A * | 10/2000 | Schenone | 414/788.1 |
| 6,131,901 A | 10/2000 | Hirohata | |
| 6,234,473 B1 | 5/2001 | Morgan et al. | |
| 6,270,067 B1 | 8/2001 | Bergmann et al. | |
| 6,325,371 B1 | 12/2001 | Araki et al. | |
| 6,427,097 B1 | 7/2002 | Martin et al. | |
| 6,428,001 B1 | 8/2002 | Jackson | |
| 6,557,846 B2 | 5/2003 | Martin et al. | |
| 6,574,520 B1 * | 6/2003 | Liu et al. | 700/96 |
| 6,793,217 B2 * | 9/2004 | Grønbjerg | 271/197 |
| 6,907,711 B2 * | 6/2005 | Ishii et al. | 53/54 |
| 6,945,531 B2 | 9/2005 | Perobelli et al. | |
| 6,986,635 B2 | 1/2006 | Talken et al. | |
| 6,988,721 B2 * | 1/2006 | Ingelsten | 271/9.13 |
| 7,024,261 B1 * | 4/2006 | Tanton | 700/96 |
| 7,052,009 B2 | 5/2006 | Roth | |
| 7,104,747 B2 | 9/2006 | Talken et al. | |
| 7,131,645 B2 | 11/2006 | Bodereau | |
| 7,415,221 B2 * | 8/2008 | Parisi et al. | 399/107 |
| 7,416,073 B1 | 8/2008 | Talken et al. | |
| 7,506,486 B2 * | 3/2009 | Wegner et al. | 53/167 |
| 7,584,834 B2 * | 9/2009 | Wood | 198/313 |
| 7,673,743 B2 * | 3/2010 | Ruff et al. | 198/861.4 |
| 7,681,883 B2 | 3/2010 | DeGruchy | |
| 7,708,276 B2 | 5/2010 | Okamoto et al. | |
| 7,731,167 B2 | 6/2010 | Prim et al. | |
| 7,887,040 B2 | 2/2011 | Roth | |
| 7,954,628 B2 * | 6/2011 | Allen et al. | 198/592 |
| 8,505,908 B2 | 8/2013 | Gendreau et al. | |
| 2004/0245071 A1 | 12/2004 | Griffin | |
| 2004/0251603 A1 | 12/2004 | Roth | |
| 2006/0202410 A1 * | 9/2006 | Ruff et al. | 271/265.01 |
| 2007/0126175 A1 * | 6/2007 | Masotta et al. | 271/225 |
| 2007/0257426 A1 | 11/2007 | DeGruchy | |
| 2008/0191414 A1 | 8/2008 | Bottger et al. | |
| 2010/0111663 A1 * | 5/2010 | Reichler | 414/799 |
| 2011/0285080 A1 | 11/2011 | Gendreau et al. | |

FOREIGN PATENT DOCUMENTS

| | | |
|---|---|---|
| DE | 23 43 678 | 3/1975 |
| DE | 39 38 536 | 6/1990 |
| DE | 198 17 064 | 4/1999 |
| DE | 10 2004 029037 | 12/2005 |
| EP | 0 150 655 | 8/1985 |
| EP | 0 173 959 | 3/1986 |
| EP | 0544910 | 6/1993 |
| EP | 0 876 979 | 11/1998 |
| EP | 1 072 548 | 1/2001 |
| FR | 2710042 | 3/1995 |
| GB | 2158812 | 11/1985 |
| JP | 60220753 | 11/1985 |
| JP | 5058530 | 3/1993 |
| JP | H10-152253 | 6/1998 |
| JP | 2001-1253613 | 9/2001 |
| JP | 2006 044858 | 2/2006 |
| WO | 92/06914 | 4/1992 |
| WO | 99/00305 | 1/1999 |

\* cited by examiner

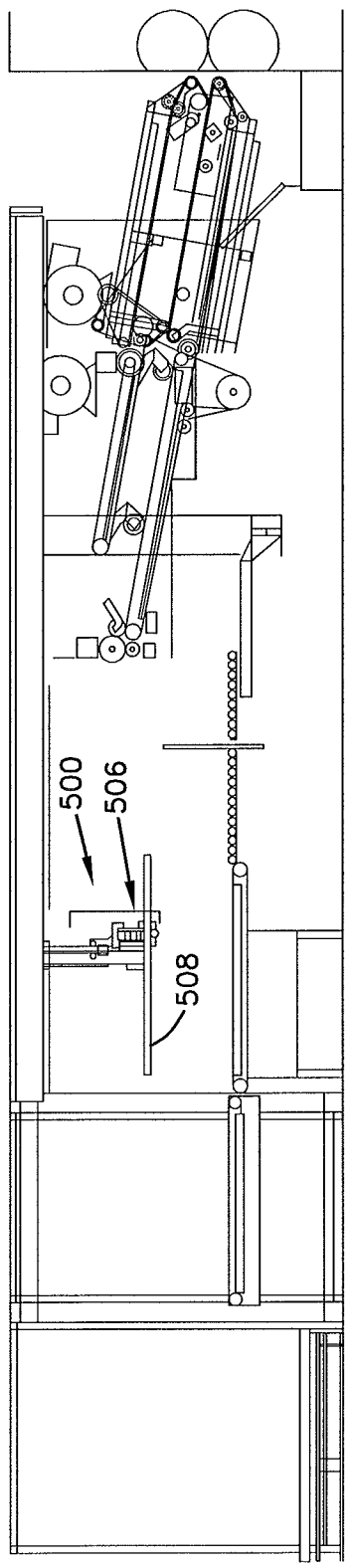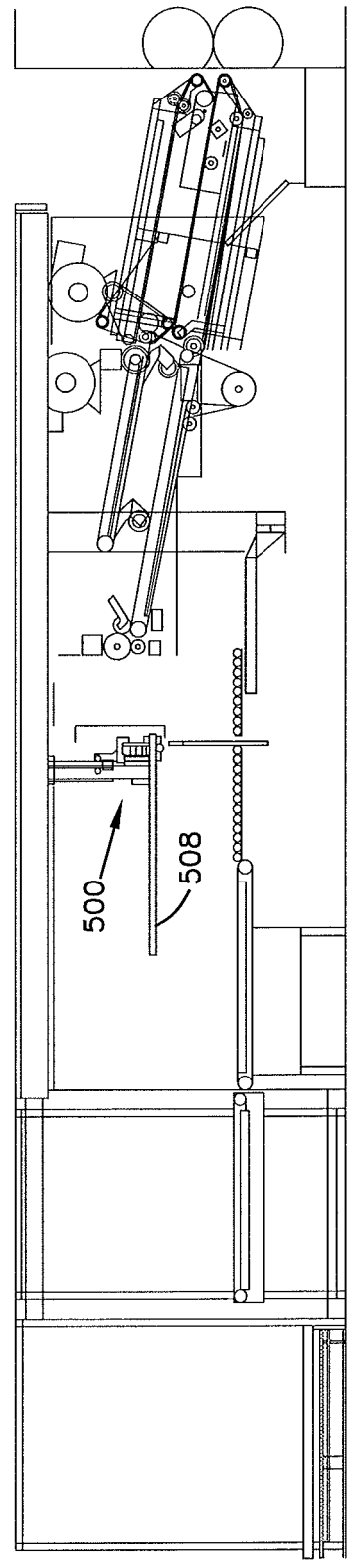
FIG. 6A
FIG. 6B

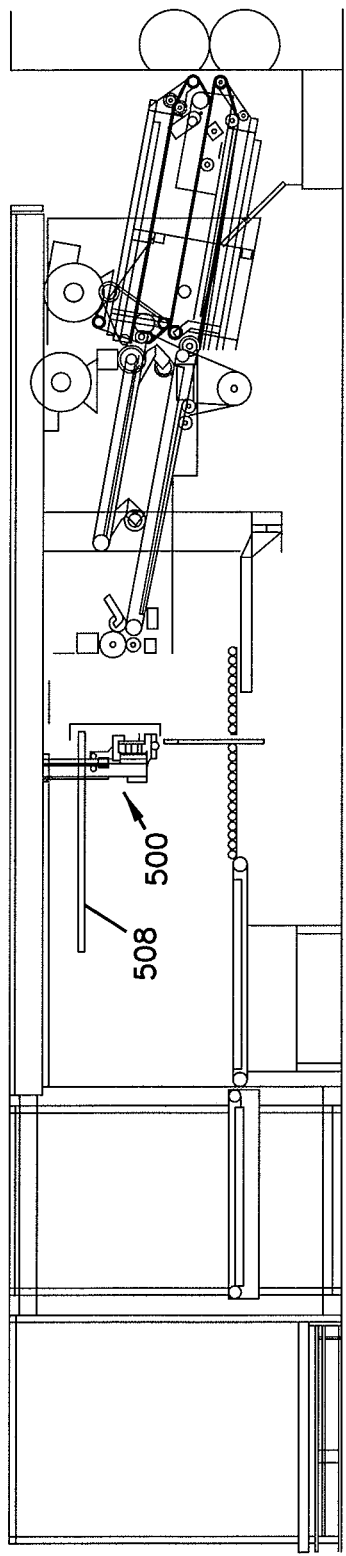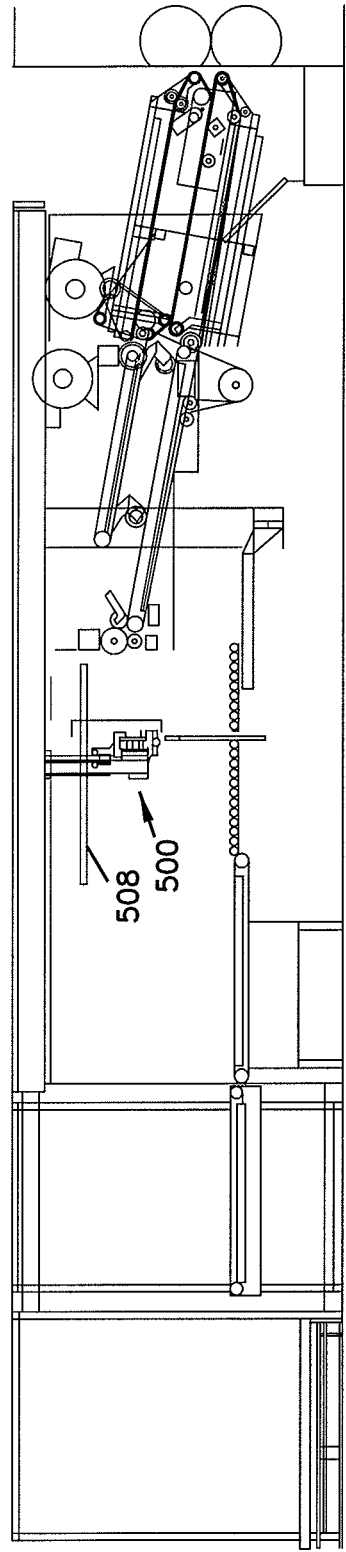
FIG. 6C
FIG. 6D

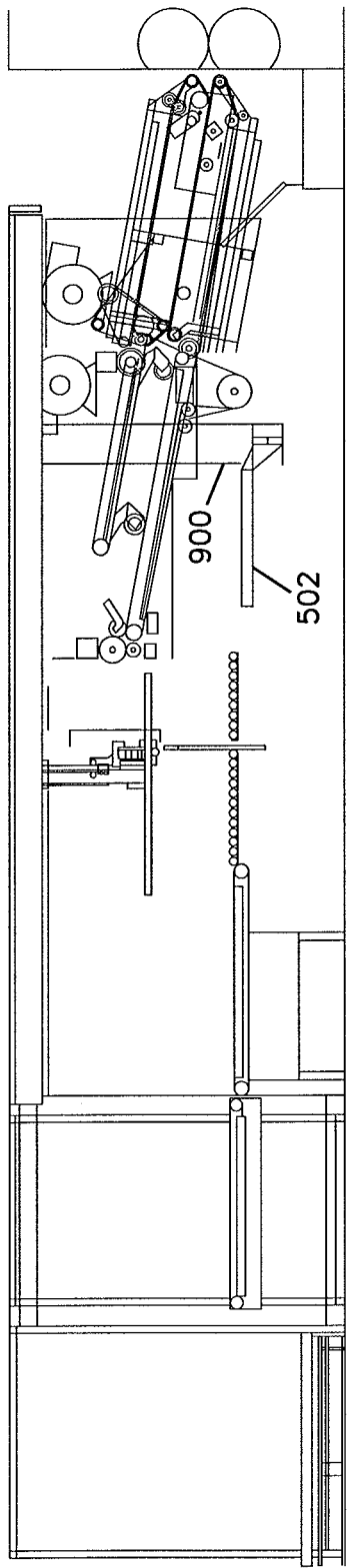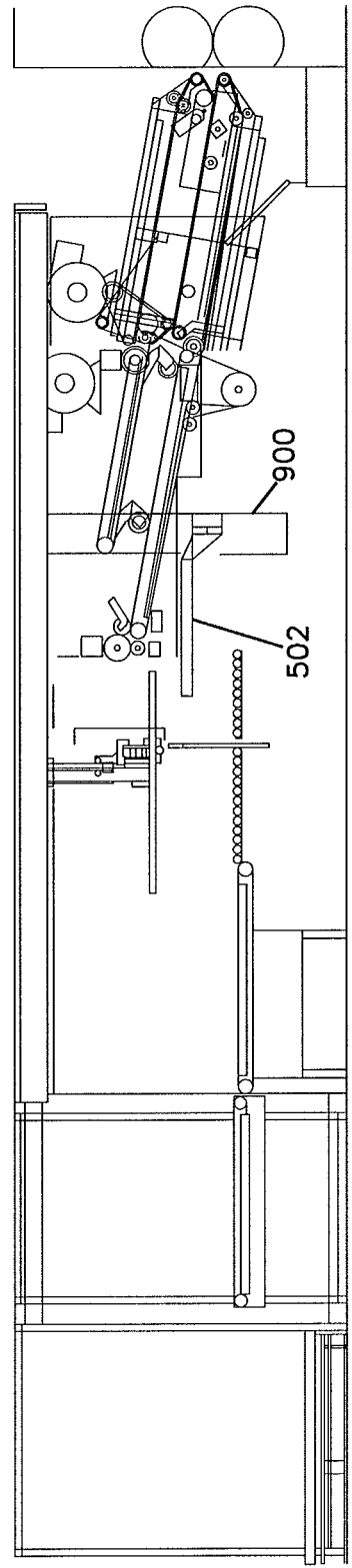
FIG. 9A
FIG. 9B

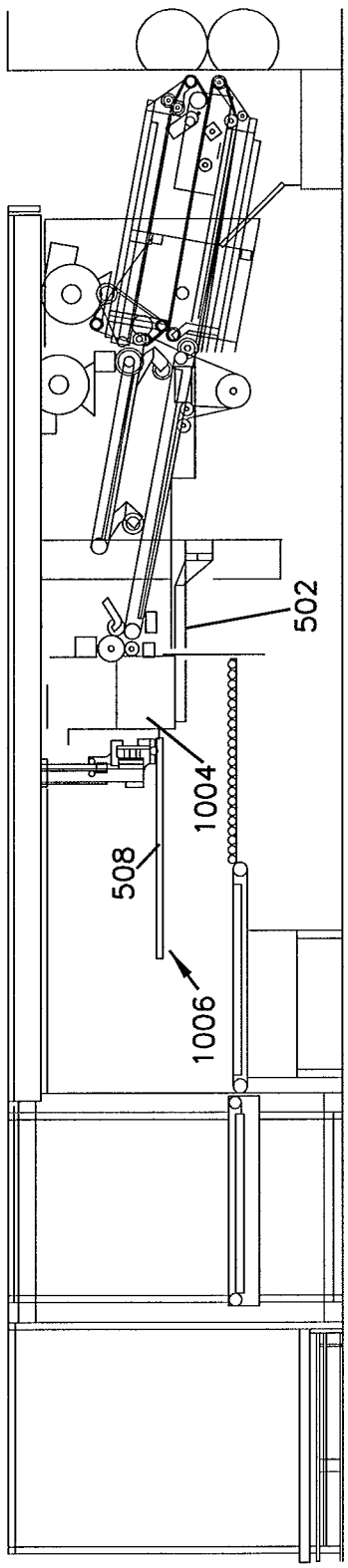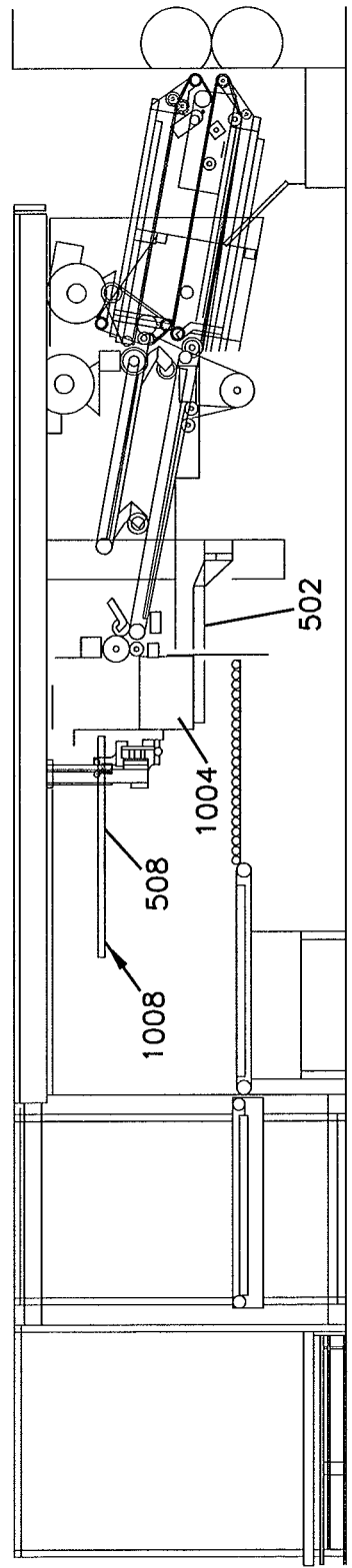

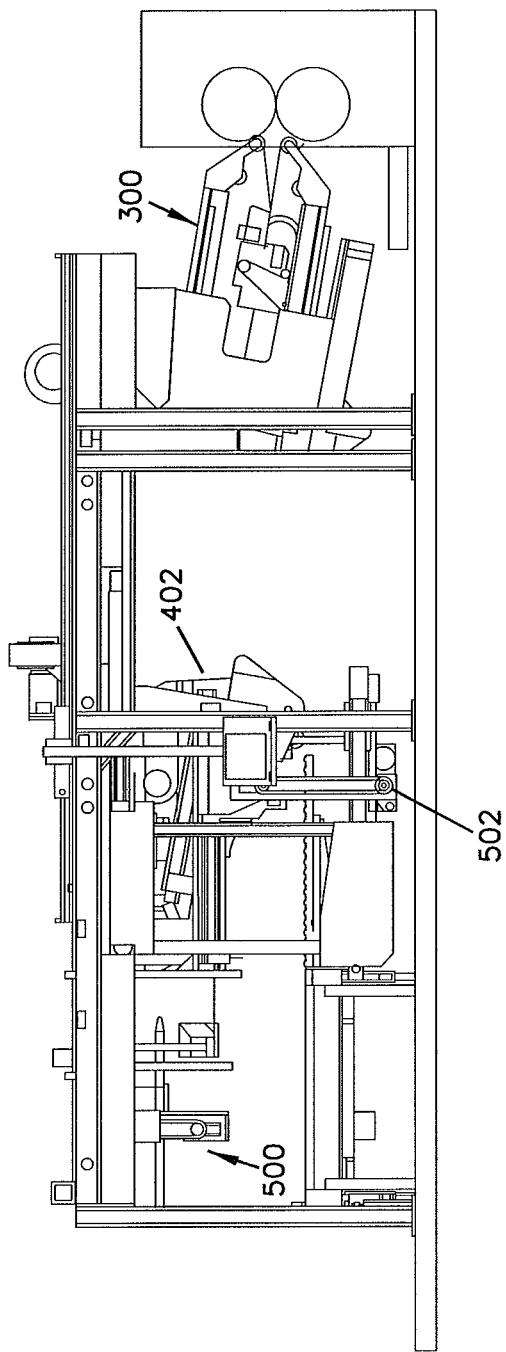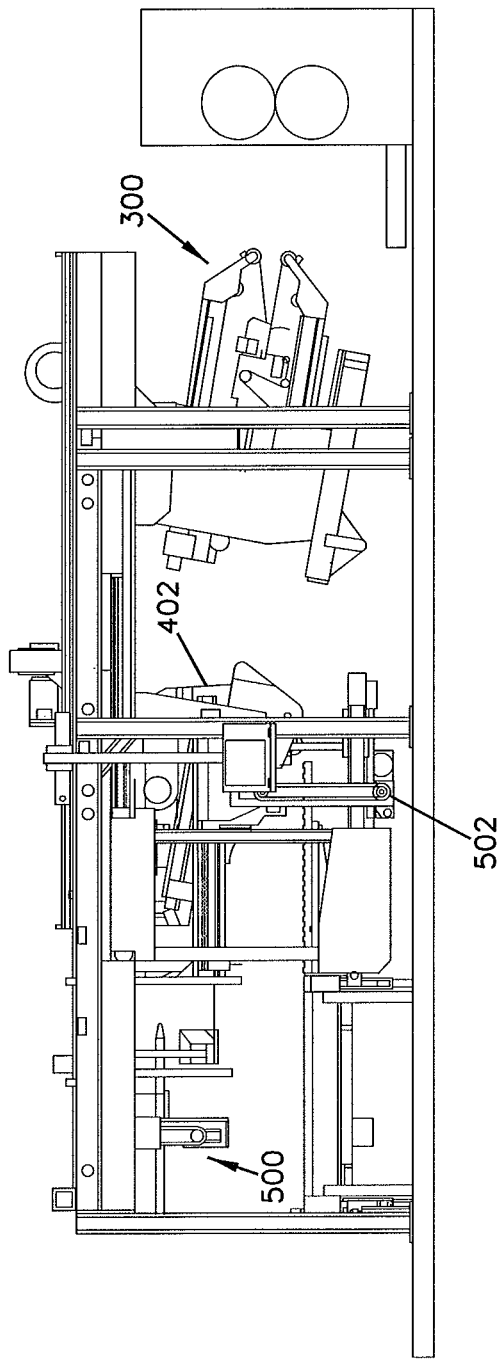

APPARATUS AND METHOD FOR STACKING CORRUGATED SHEET MATERIAL

CROSS-REFERENCE TO RELATED APPLICATION(S)

This application claims priority of U.S. Prov. Pat. Appl. No. 61/515,189, filed Aug. 4, 2011, which is hereby incorporated herein by reference in its entirety.

FIELD OF THE INVENTION

The present disclosure relates to apparatus and methods for stacking corrugated sheet material.

BACKGROUND OF THE INVENTION

Apparatus for stacking corrugated sheet material are typically designed for receiving container blanks that have been cut from sheet material, such as corrugated sheet material, in a rotary die cutter and placing the blanks of corrugated material into stacks for either movement to another process or for shipment. Such rotary die cutters normally eject the cut blanks at a lineal exit speed of several hundred if not thousands of feet per minute. Such an outfeed speed presents a very significant problem in providing equipment that is capable of efficiently stacking such blanks without either damaging the blanks or slowing the operation of the rotary die cutter, as the blanks are often rather fragile and can be easily damaged. Thus, apparatus for stacking corrugated sheet material have been provided that are capable of operating at very high speeds without damaging the fragile container blanks.

However, traditional apparatus do not permit safe and easy access to all major parts of the machine in order to facilitate set-up, recovery from jams, and cleaning and maintenance. Often, such machines require an operator to climb up on the machine using, for example, ladders or built-in staircases and to reach down into the machine. Additionally, or alternatively, some traditional apparatus use a pit in order to position the machine to a proper height.

Thus, there exists a need in the art for apparatus and methods for stacking corrugated sheet material which overcome the deficiencies described above. Particularly, there is a need in the art for apparatus and methods for stacking corrugated sheet material that permit safe and easy access to many or all of the necessary parts for operation in order to facilitate set-up, recovery from jams, and cleaning and maintenance. More particularly, there is a need in the art for apparatus and methods for stacking corrugated sheet material that permit safe and easy access to many or all of the necessary parts for operation without the necessity of an operator climbing up and onto the apparatus or requiring a pit for properly positioning the apparatus.

BRIEF SUMMARY OF THE INVENTION

The present disclosure, in one embodiment, relates to an apparatus for stacking sheet material received from a converting machine. The apparatus may include a trim section permitting scrap material to fall away from a plurality of blanks of sheet material and a stacking section, downstream the trim section for receiving the blanks of sheet material with scrap material substantially removed therefrom and forming bundles each having a plurality of blanks and transferring the bundles downstream. The apparatus may further include a plurality of longitudinal positioning systems for independently longitudinally positioning a plurality of components of the apparatus in at least one of upstream or downstream directions so as to create an operator access space between at least two of the components. In some embodiments, the apparatus may further include an incline conveyor section downstream the trim section and upstream the stacking section, the incline conveyor section having an incline conveyor delivering the blanks of sheet material to the stacking section at an elevated height. The stacking section may have a stacking apparatus with a plurality of substantially horizontal batch forks for receiving the blanks of sheet material from the incline conveyor section. The stacking section may also include a plurality of substantially horizontal lift forks for receiving bundles from the batch forks, the batch forks and lift forks spaced such that the batch forks and lift forks may substantially align vertically with one another. The stacking section may further still include a plurality of substantially vertical pusher forks for transferring the bundles away from the lift forks, at least a portion of the pusher forks spaced such that they pass between lift forks. In some embodiments, the trim section may have a takeaway conveyor for conveying the plurality of blanks of sheet material to the incline conveyor. In certain embodiments, the plurality of longitudinal positioning systems can individually longitudinally position at least two of the takeaway conveyor, the incline conveyor, or the stacking apparatus. The apparatus may have a plurality of support masts supporting an overhead support apparatus, at least one of the takeaway conveyor, incline conveyor, or stacking apparatus being supported from above by the overhead support apparatus.

The present disclosure, in another embodiment, also relates to an apparatus for stacking sheet material received from a converting machine. The apparatus may include a trim section permitting scrap material to fall away from a plurality of blanks of sheet material, a stacking section, downstream the trim section for receiving the blanks of sheet material with scrap material substantially removed therefrom and forming bundles each having a plurality of blanks and transferring the bundles downstream, and a bundle accumulation section for receiving bundles from the stacking section. The apparatus may further include a plurality of longitudinal positioning systems for independently longitudinally positioning a plurality of components of the apparatus in at least one of upstream or downstream directions so as to create an access space for at least one of the components. In some embodiments, the stacking section may include a stacking apparatus having a plurality of substantially horizontal batch forks for receiving the blanks of sheet material from the incline conveyor section. The batch forks may be longitudinally and vertically positionable with respect to an upstream infeed by which the stacking apparatus receives the blanks of sheet material.

The present disclosure, in yet a further embodiment, relates to a method for creating operator access space for an apparatus for stacking sheet material having one or more sections for forming bundles of blanks of sheet material and conveying the bundles downstream. The method may include providing a plurality of longitudinal positioning systems for independently longitudinally positioning a plurality of components of the apparatus in at least one of upstream or downstream directions so as to create an access space for at least one of the components by which an operator can access the component for setting up the component, recovering from a jam at the component, cleaning of the component, or maintenance of the component. The method may also include providing an overhead support apparatus, a plurality of the components of the apparatus being supported from above by the overhead support apparatus, the longitudinal positioning systems being provided by the overhead support apparatus.

While multiple embodiments are disclosed, still other embodiments of the present disclosure will become apparent to those skilled in the art from the following detailed description, which shows and describes illustrative embodiments of the disclosure. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

While the specification concludes with claims particularly pointing out and distinctly claiming the subject matter that is regarded as forming the various embodiments of the present disclosure, it is believed that the embodiments will be better understood from the following description taken in conjunction with the accompanying Figures, in which:

FIGS. 6A-D are side schematic views illustrating movement of batch forks of an apparatus for stacking corrugated sheet material in accordance with an embodiment of the present disclosure.

FIGS. 9A-B are side schematic views illustrating movement of lift forks of an apparatus for stacking corrugated sheet material in accordance with an embodiment of the present disclosure.

FIGS. 10A-G are side schematic views illustrating operation of an apparatus for stacking corrugated sheet material in accordance with an embodiment of the present disclosure.

FIG. 11C is a side schematic view of an apparatus for stacking corrugated sheet material in accordance with an embodiment of the present disclosure with the longitudinal positioning systems actuated to provide access space to the incline conveyor section.

FIG. 11D is a side schematic view of an apparatus for stacking corrugated sheet material in accordance with an embodiment of the present disclosure with the longitudinal positioning systems actuated to provide access space to each of the converting machine, trim section, and incline conveyor section.

DETAILED DESCRIPTION

The present disclosure relates to novel and advantageous apparatus and methods for stacking corrugated sheet material. Particularly, the present disclosure relates to novel and advantageous apparatus and methods for stacking corrugated sheet material that permit safe and easy access to many or all of the necessary parts for operation in order to facilitate set-up, recovery from jams, and cleaning and maintenance. More particularly, the present disclosure relates to novel and advantageous apparatus and methods for stacking corrugated sheet material that permit safe and easy access to many or all of the necessary parts for operation without the necessity of an operator climbing up and onto the apparatus.

An apparatus for stacking corrugated sheet material as described herein may be configured for receiving container blanks that have been cut from sheet material, such as corrugated sheet material, in a rotary die cutter and placing the blanks of corrugated material into stacks for either movement to another process or for shipment. While discussed generally herein as configured for use with corrugated sheet material, it is recognized that any other type of sheet material may be stacked by the various embodiments of apparatus described herein, such as but not limited to drywall, paperboard, and other types of generally flat sheets of material. Similarly, while discussed generally herein with respect to receiving sheet material from a rotary die cutter, it is recognized that the sheet material may be received from any suitable converting machine or apparatus capable of feeding sheet material to the stacking apparatus described herein.

Generally, in embodiments of stacking apparatus described herein, after being cut by a rotary die cutter, the container blanks may be received from the rotary die cutter in side-by-side blank rows. As an initial process of the stacking apparatus, the side-by-side blank rows may be longitudinally and/or laterally separated. Following separation, the blanks may be conveyed to a stacking means for appropriate stacking and counting. From there, the bundles may be forwarded to a bundle accumulation section.

One advantage of the various embodiments of stacking apparatus described herein is that they permit sections or portions of the apparatus to open up and generally allow safe operator access to many or all of the necessary parts for operation. This can facilitate set-up of the apparatus for each sheet configuration delivered, for example, by the rotary die cutter, and can also facilitate recovery from jams, cleaning, and maintenance. In one embodiment, each of these tasks can typically be performed without the necessity of an operator climbing up and onto the apparatus.

Figure 1:
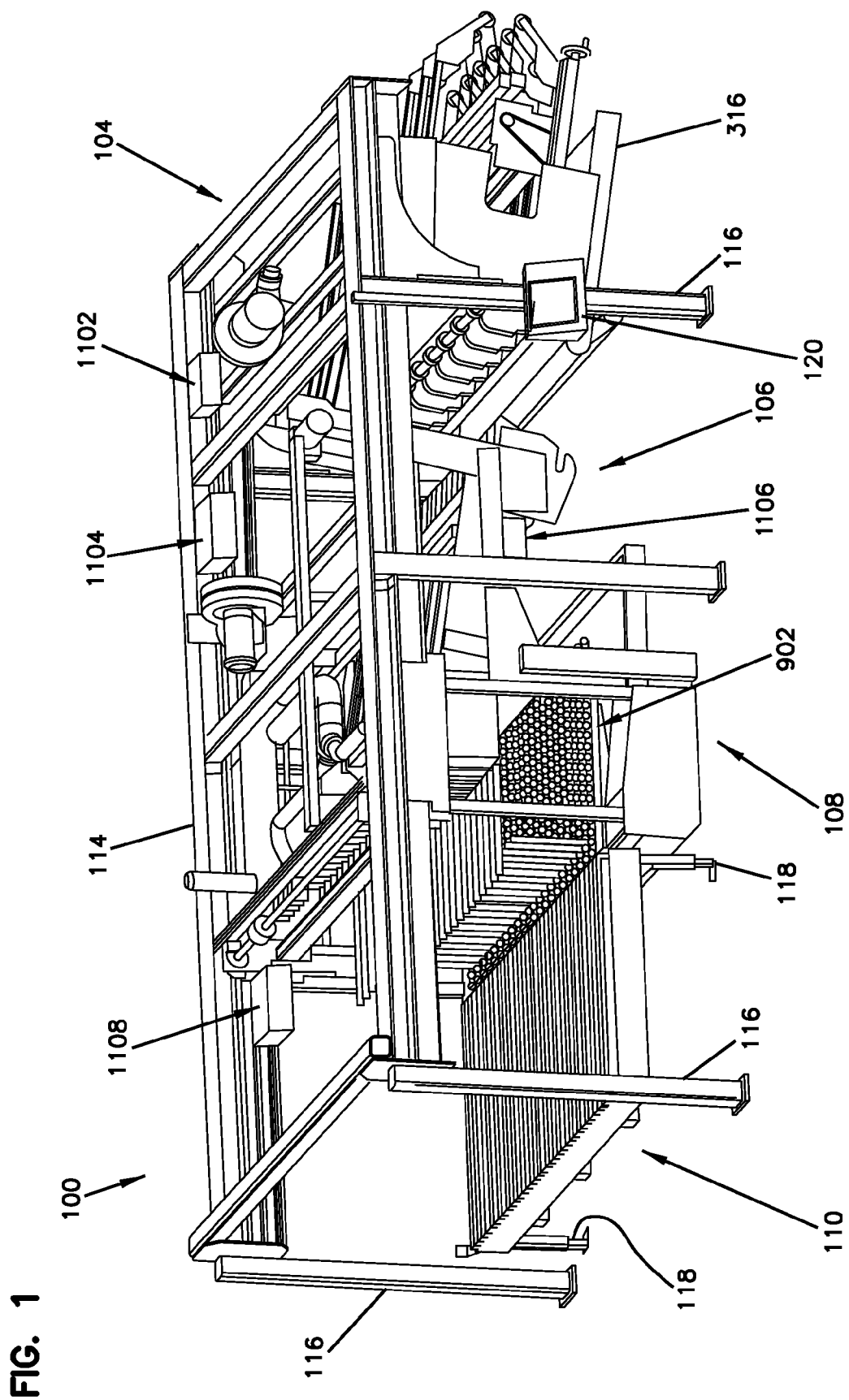
FIG. 1 is a perspective view of an apparatus for stacking corrugated sheet material in accordance with an embodiment of the present disclosure.
Figure 2:
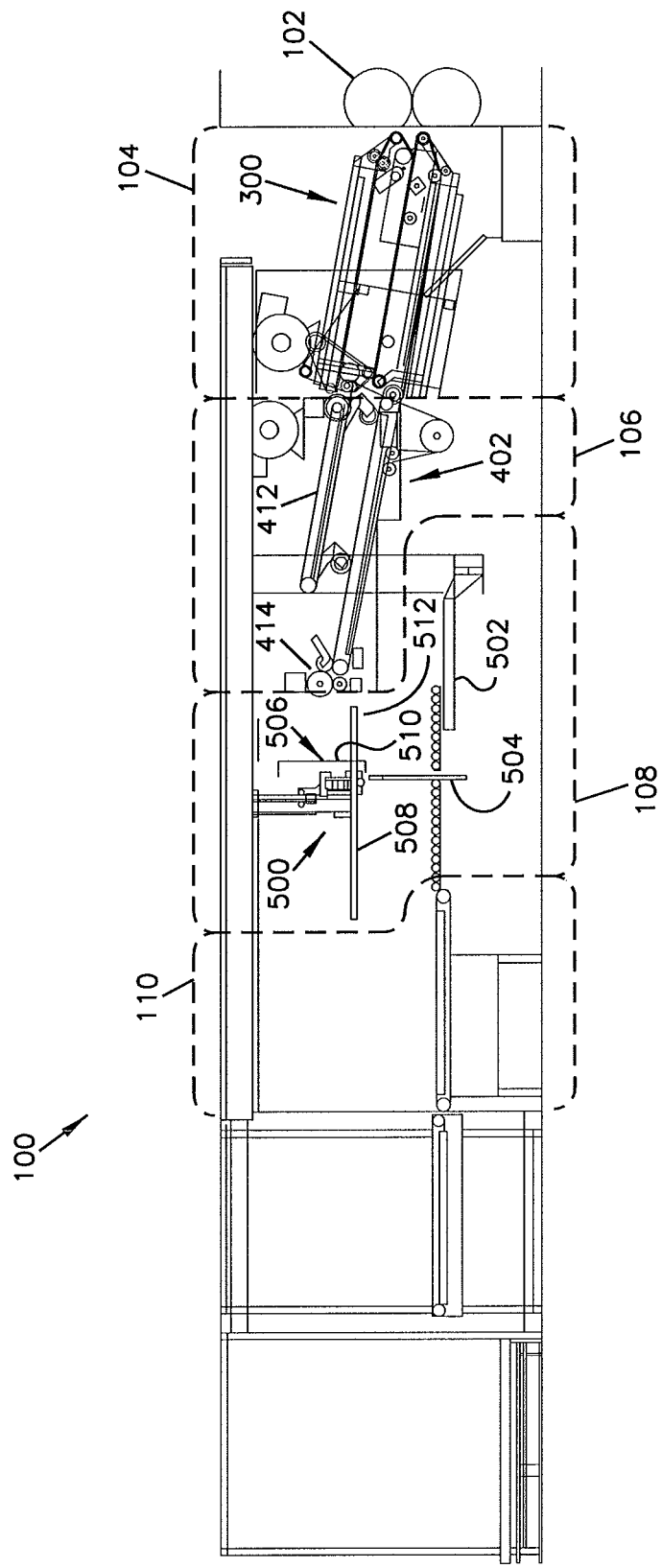
FIG. 2 is a side schematic view of an apparatus for stacking corrugated sheet material in accordance with an embodiment of the present disclosure.

FIG. 1 illustrates an apparatus for stacking corrugated sheet material 100 according to one embodiment of the present disclosure. FIG. 2 similarly illustrates an apparatus for stacking corrugated sheet material 100 according to one embodiment of the present disclosure in schematic. As illustrated in FIGS. 1 and 2, the stacking apparatus 100 may generally include several zones or sections having different functions, such as but not limited to a trim section 104, an incline conveyor section 106, a stacking section 108, and a bundle accumulation section 110.

In one embodiment, the stacking apparatus 100 may be configured generally in what may be referred to herein as a "hanging" mount embodiment, although the use of the term "hanging" is not meant to convey any particular characteristic to the stacking apparatus not described in further detail below and is otherwise not meant to be limited solely by the normal definition of that term. The hanging mount embodiment is indeed but one embodiment configuration which the stacking apparatus may take. In a hanging embodiment, generally illustrated in FIG. 1, the stacking apparatus may include an overhead support apparatus 114, which may be comprised of a plurality of longitudinal and transverse support beams, supported by a plurality of vertical masts or legs 116. In this manner, several or all of the components of the trim section 104, incline conveyor section 106, stacking section 108, and bundle accumulation section 110 may be suspended, or hung, from the overhead support apparatus 114. Accordingly, in many variations of a hanging embodiment, many of the components of the stacking apparatus 100 do not need separate support masts or legs and may be suspended substantially entirely above the ground or floor, thereby creating an environment that is easier to clean and is less hazardous. However, in some embodiments, one or more components of the trim section 104, incline conveyor section 106, stacking section 108, and/or bundle accumulation section 110 may indeed include separate support masts or legs 118, as shown for example in the bundle accumulation section of FIG. 1. However, in many variations of a hanging embodiment, it can be desirable that the number of elements including their own support masts or legs 118 is limited.

In another embodiment, the stacking apparatus 100 may be configured generally in what may be referred to herein as a floor mount embodiment, in which several components of the trim section 104, incline conveyor section 106, stacking section 108, and/or bundle accumulation section 110 may have separate support masts or legs rather than being suspended or hung from an overhead support apparatus 114. In still other embodiments, various combinations of the hanging and floor mount embodiments, such that some components of the stacking apparatus 100 are suspended or hung from an overhead support apparatus 114 while others are not, are also entirely suitable.

Process flow through the apparatus, also referred to herein as the conveying direction, is from right to left in both FIGS. 1 and 2. For purposes of the present disclosure, longitudinal direction includes the upstream and downstream conveying direction. Also, for purposes of the present disclosure, a leading edge of a sheet may refer to the front or leading edge of the sheet as it travels through the apparatus in the conveying direction, and a trailing edge of a sheet may refer to the back or trailing edge of the sheet as it travels through the apparatus in the conveying direction. Also, for purposes of the present disclosure, a sheet length may refer to a dimension of the sheet measured along the direction of travel. As illustrated in FIG. 2, the sheet material may be received from the outfeed of a previous apparatus capable of feeding sheet material, such as but not limited to a rotary die cutter 102. In one embodiment of the stacking apparatus 100, the sheet material is received from the rotary die cutter 102 by the trim section 104. As the sheet material is received from the rotary die cutter 102, the sheet material may contain trim or scrap pieces of material that are to be removed from the remaining sheet material and is desirably permitted to fall away or forced away from the remaining sheet material so that it does not become trapped in the stacking apparatus, potentially causing severe run time issues or other issues for the end user. Accordingly, one purpose of the trim section 104 may be to allow loose trim or scrap pieces to fall out of the product stream, and therefore, the trim section may include means for blowing, brushing, or beating the loose trim or scrap pieces from the sheet material.

Figure 3A:
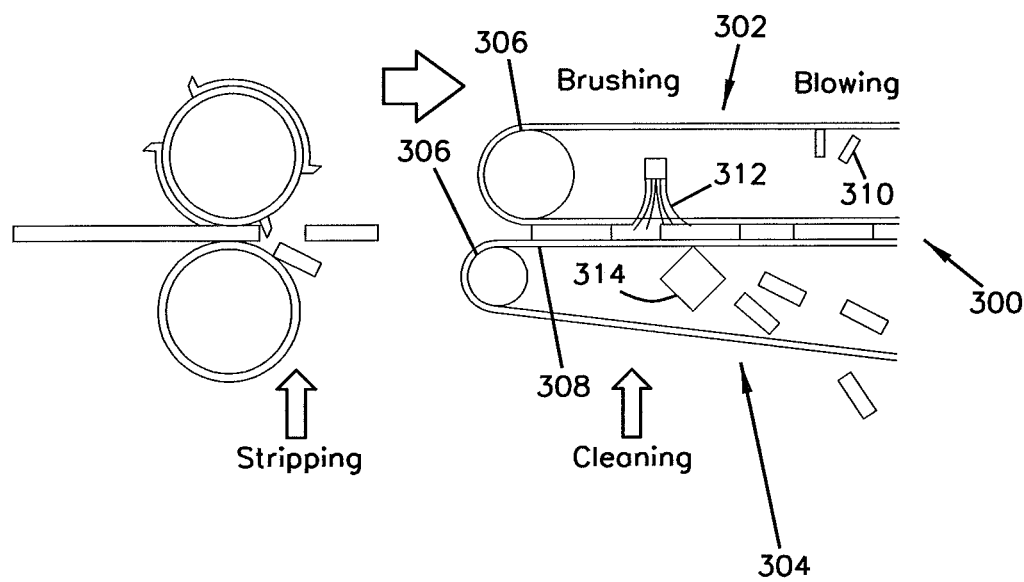
FIG. 3A is a diagram illustrating the general process of a trim section in accordance with an embodiment of the present disclosure.
Figure 3B:
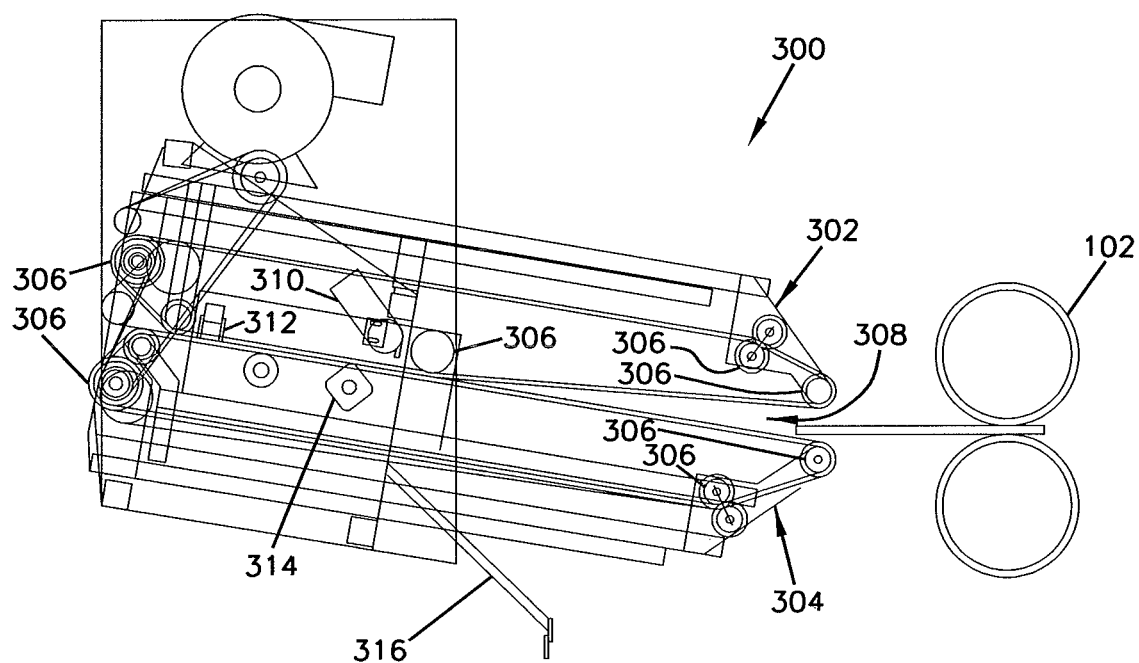
FIG. 3B is a side schematic view of a trim section of an apparatus for stacking corrugated sheet material in accordance with an embodiment of the present disclosure.

As shown schematically in FIGS. 3A and 3B, the trim section 104 may include a takeaway conveyor 300. The takeaway conveyor 300 may include an upper belt conveyor 302 and a lower belt conveyor 304. However, in other embodiments, the takeaway conveyor 300 may include just an upper belt conveyor or a lower belt conveyor. Nonetheless, the use of both an upper and lower belt conveyor 302, 304 may increase the grip of the takeaway conveyor 300 on the sheet material. In various embodiments, the upper belt conveyor 302 may be positioned relative to the lower belt conveyor 304 such that a lower surface of the upper belt conveyor and an upper surface of the lower belt conveyor are proximate or substantially or nearly abutting. The upper belt conveyor 302 and lower belt conveyor 304 may each include a single belt extending across the width of the takeaway conveyor 300 or may each include a plurality of laterally spaced individual belt conveyors or belt conveyor sections, as illustrated in FIG. 1. The upper and lower belt conveyors 302, 304 may move in unison to frictionally engage and convey sheets of material along the takeaway conveyor 300 and toward further processing sections of the stacking apparatus 100 in the conveying direction. The upper and lower belt conveyors 302, 304 may be conventional conveyor belts used in the corrugated, paperboard, or other sheet conveyance industry. The upper and lower belt conveyors 302, 304 may be endless belts or other belt types known in the art to transport or convey sheets. In some embodiments, the upper and lower belt conveyors 302, 304 may each be supported by a plurality of belt support rollers 306 at least one of which may be driven to provide the upper and lower belt conveyors 302, 304 with their belt or line speeds. In some embodiments, the line speed of the upper and lower belt conveyors 302, 304 will approximate the line speed of the rotary die cutter 102 or other converting machine from which the sheet material is received by the trim section 104. However, it is recognized that the line speed of the upper and lower belt conveyors 302, 304 may also be slower or faster than that of the rotary die cutter 102 or other converting machine.

The upper and lower belt conveyors 302, 304 may form a nip point 308 of the takeaway conveyor 300. The nip point 308 may be defined as the upstream-most point of convergence between the upper and lower belt conveyors 302, 304, which initially nips or grabs the leading edges of the sheets of material as they are fed in the conveying direction from the rotary die cutter 102. In some embodiments, the takeaway conveyor 300 may include an adjustment drive operatively associated with either or both of the upper and lower belt conveyors 302, 304 and configured to adjust the position of the nip point 308 in or counter to the conveying direction, thereby creating a variably adjustable nip point 308, as described in further detail in U.S. patent application Ser. No.

13/166,209, titled "System and Method for Varying a Nip Point," which is hereby incorporated by reference herein in its entirety.

As illustrated in FIGS. 3A and 3B, the takeaway conveyor 300 may include a blower or air knife assembly 310, a brush assembly 312, which may include one or more brushes that extend across the takeaway conveyor 300 to agitate and remove trim or scrap material, and/or a beater bar assembly 314 for blowing, brushing, or beating or disrupting, respectively, the loose trim or scrap pieces from the sheet material. The beater bar assembly 314 may be mounted at any suitable location, such as but not limited to above or below the takeaway conveyor 300, and may be, for example, a tube having a circular, square, rectangular, etc. cross-section or may use rollers, or may be any other suitable type of beater bar assembly 314 as will be understood by those skilled in the art. In some embodiments, where a variably adjustable nip point 308 is employed, for example, the blower or air knife assembly 310, brush assembly 312, and/or beater bar assembly 314 may be positionally adjusted to the desirable location relative the nip point or other point. The takeaway conveyor 300 may also include a scrap deflector and/or scrap collector 316 for catching the removed trim or scrap material and either deflecting the trim or scrap material toward a collection bin or site or collecting the trim or scrap material itself. In some embodiments, the scrap deflector 316 may include a conveyor, such as a belt conveyor, for deflecting or conveying the trim or scrap material toward a collection bin or site.

In some embodiments, the sheet material may be received from the rotary die cutter 102 as individual blanks of material. However, as discussed above, in other embodiments, the sheet material may be received from the rotary die cutter 102 in side-by-side blank rows. Accordingly, another purpose of the trim section 104 may be to laterally separate the side-by-side blank rows of sheets. In some embodiments, therefore, the upper and lower belt conveyors 302, 304 may each include a plurality of laterally spaced individual belt conveyors or belt conveyor sections, wherein at least some of the laterally spaced individual belt conveyors or belt conveyor sections can be adjusted relative each other to skew or laterally separate the side-by-side blanks. Generally, the belts of the upper and lower belt conveyors 302, 304 may be set up with an appropriate skew to facilitate separation between flows of side-by-side sheet material across the takeaway conveyor 300 width.

In addition, whether the sheet material is received from the rotary die cutter 102 as individual blanks of material or in side-by-side blank rows, the takeaway conveyor 300 can also be configured for longitudinally separating the blanks of sheets in the conveying direction, if desired. One method of doing so would be to operate the takeaway conveyor 300 at a line speed faster than that of the rotary die cutter 102. In some embodiments, it can be desirable to have at least two upper belts of the upper belt conveyor 302 and at least two lower belts of the lower belt conveyor 304 dedicated to each blank in a blank row. However, other belt configurations may be desirable, depending on blank size and/or desired belt set up.

With reference back to FIGS. 1 and 2, the sheets of material, or blanks, may be transported to the end of the trim section 104 by takeaway conveyor 300 where they may be delivered to the incline conveyor section 106. In some embodiments, the takeaway conveyor 300 may be angled upwards in the conveying direction, such as upwards at about a 10° angle or any other suitable angle, which can cause a change in direction of the sheets of material as well as facilitate delivery to the incline conveyor section 106. However, it is recognized that the takeaway conveyor 300 need not be angled upward, and in other embodiments, could be held horizontally or alternatively angled downward.

Figure 4:
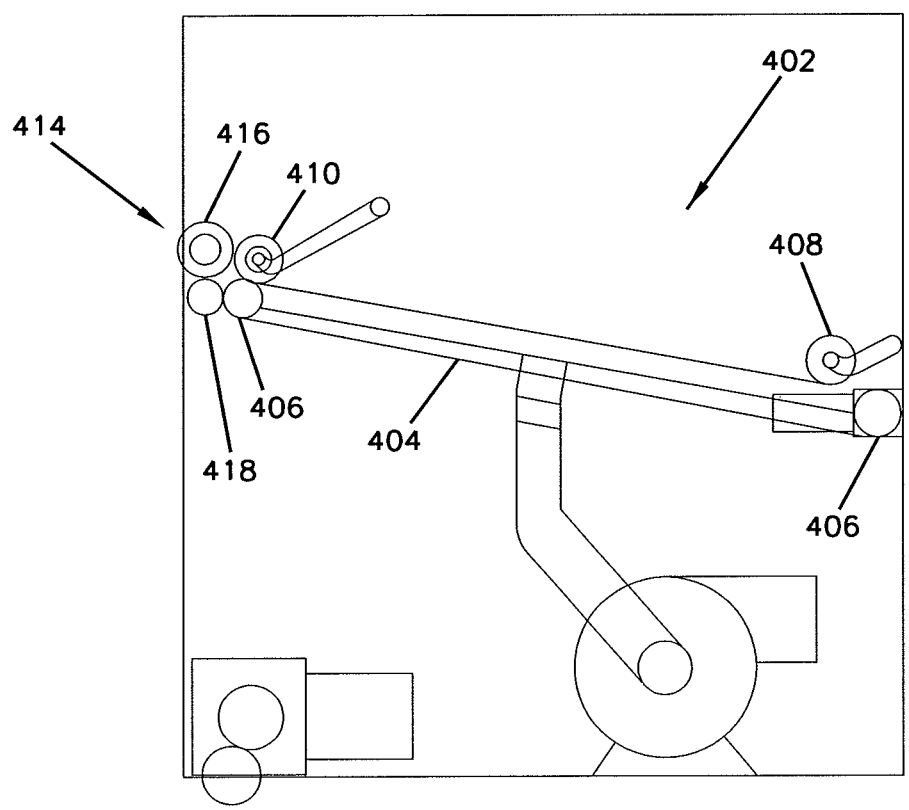
FIG. 4 is a side schematic view of an incline conveyor of an apparatus for stacking corrugated sheet material in accordance with an embodiment of the present disclosure.

Generally, the incline conveyor section 106 may receive the sheets of material from the trim section 104 at a first position and move the sheets upward to an elevated position for discharging to the stacking section 108. FIGS. 2 and 4 illustrate various embodiments of an incline conveyor section 106, FIG. 2 illustrating one embodiment of a hanging incline conveyor section and FIG. 4 illustrating one embodiment of a floor-mounted incline conveyor section. As illustrated in FIGS. 2 and 4, the incline conveyor section 106 may include an incline conveyor 402. The incline conveyor may be angled upwards in the conveying direction, such as upwards at about a 10° angle or any other suitable angle, to bring the sheets to an elevated position for discharging to the stacking section 108. In one embodiment for example, the incline conveyor 402 may be approximately eighty-five inches long and inclined at approximately a 10° angle. However, the incline conveyor can of course be any suitable length and angle.

The incline conveyor 402 may, in one embodiment, be similar to the takeaway conveyor 300. However, in other embodiments, as shown in FIGS. 2 and 4, the incline conveyor 402 may include a belt conveyor 404, which may be but is not limited to a vacuum belt conveyor. The belt conveyor 404 may include a single vacuum belt conveyor extending across the width of the incline conveyor 400 or may include a plurality of laterally spaced vacuum belt conveyors or vacuum belt conveyor sections, as illustrated in FIG. 1. For example, in one embodiment, the belt conveyor 404 may include eight laterally spaced vacuum belt conveyors or vacuum pans. In general, the belt conveyor 404 may be any conventional conveyor belt used in the corrugated, paperboard, or other sheet conveyance industry. The belt conveyor 404 may be supported by a plurality of belt support rollers 406 at least one of which may be driven to provide the belt conveyor 404 with its belt or line speed. In some embodiments, the line speed of the belt conveyor 404 will approximate the line speed of the takeaway conveyor 300. However, it is recognized that the line speed of the belt conveyor 404 may also be slower or faster than that of the takeaway conveyor 300. For example, in some embodiments, lateral and/or longitudinal spacing of the sheets of material may be performed additionally or alternatively in the incline conveyor section 106 by incline conveyor 402. In one embodiment, longitudinal separation of the sheets of material may be accomplished by operating the incline conveyor 404 at a faster line speed than the takeaway conveyor 300.

In a further embodiment, the incline conveyor 400 may alternatively or additionally include an overhead vacuum conveyor. An overhead vacuum conveyor may be similar to belt conveyor 404, except generally turned upside down such that the sheets of material are held to the belt conveyor from underneath the conveyor by means of an overhead vacuum, as will be understood by those skilled in the art. An overhead vacuum incline conveyor may also be angled upwards in the conveying direction, such as upwards at about a 10° angle or any other suitable angle, to bring the sheets to an elevated position for discharging to the stacking section 108.

The incline conveyor 402 may also include one or more pinning or hold down rollers or wheels 408, 410. In one embodiment, the incline conveyor 402 may include one or more pinning or hold down rollers or wheels 408 near a receiving end of the incline conveyor 402 which can be designed to nip and or hold down the sheets of material to the belt conveyor 404 as they are received by, and transition from, the trim section 104. In one embodiment, there is at least one pinning or hold down roller or wheel 408 per vacuum belt conveyor or vacuum belt conveyor section. The incline conveyor may additionally or alternatively include one or more pinning or hold down rollers or wheels 410 downstream of the receiving end of the incline conveyor 402 which can be designed to nip and or hold down the sheets of material as they are conveyed by the belt conveyor 404 and/or as they are delivered to the stacking section 108. In one embodiment, there is at least one pinning or hold down roller or wheel 410 per vacuum belt conveyor or vacuum belt conveyor section. Any of the pinning or hold down rollers or wheels 408, 410 may be automatically or manually adjusted in location and/or pinning or hold down force. In one embodiment, the pinning or hold down rollers or wheels 408, 410 may be operably connected, such as by a mechanical linkage 412 or other suitable linkage, and may be automatically or manually adjusted together. In one embodiment, the pinning or hold down rollers or wheels 408, 410 may be urethane wheels, but it is recognized that the pinning or hold down rollers or wheels could be manufactured from any suitable material or combination of materials.

At or near the delivery end of the incline conveyor 402, in some embodiments, the incline conveyor 402 may include a means or device 414 for decelerating the sheets of material as they are delivered to the stacking section 108. In one embodiment, the deceleration device 414 may include a nip device 416 working in cooperation with a kick roller 418. The kick roller 418 may generally operate at a fixed line speed slower than that of the incline conveyor 402. In some embodiments, the line speed of the kick roller 418 may be around 200 to 300 feet per minute; however, it is recognized that in order to decelerate the sheets of material, any line speed less than that of the incline conveyor 402 line speed should be suitable. In general, a nip point of the nip device 416 and the kick roller 418 may be positioned periodically toward and away from one another to nip the sheet traveling between them. In one embodiment, the nip point of the nip device 416 is periodically moveable toward and away from the kick roller 418. In other embodiments, the kick roller 418 is periodically moveable toward and away from the nip point of the nip device 416. In still further embodiments, the nip point of the nip device 416 and the kick roller 418 are each periodically moveable toward and away from one another. As a sheet of material passes between the nip device 416 and the kick roller 418 while the nip point of the nip device is positioned toward the kick roller, the sheet of material is decelerated by means of the slower line speed of the kick roller. Such means or devices 414 for decelerating sheets of material are described in detail in U.S. Pat. No. 7,052,009, titled "Sheet Deceleration Apparatus and Method," and U.S. Pat. No. 7,887,040, titled "Sheet Deceleration Apparatus and Method with Kicker," each of which is hereby incorporated herein by reference in its entirety. In one embodiment, the nip device 416 may be a simple roller. However, other nip devices 416 or means or device 414 for decelerating the sheets of material may be used and are described in detail, for example, in U.S. patent application Ser. No. 13/086,162, titled "Sheet Deceleration Apparatus and Method," which is also hereby incorporated herein by reference in its entirety.

Generally, the stacking section 108 may receive the sheets of material from the incline conveyor section 106, stack the sheets into bundles, and deliver them to the bundle accumulation section 110. The stacking section 108 may typically receive the sheets of material one row at a time, each row comprising an individual sheet or two or more side-by-side sheets, which may be laterally separated as described above. In general, the stacking section 108 is where bundles of the sheet material may be formed, conditioned, separated, and ejected to the bundle accumulation section 110.

Figure 5:
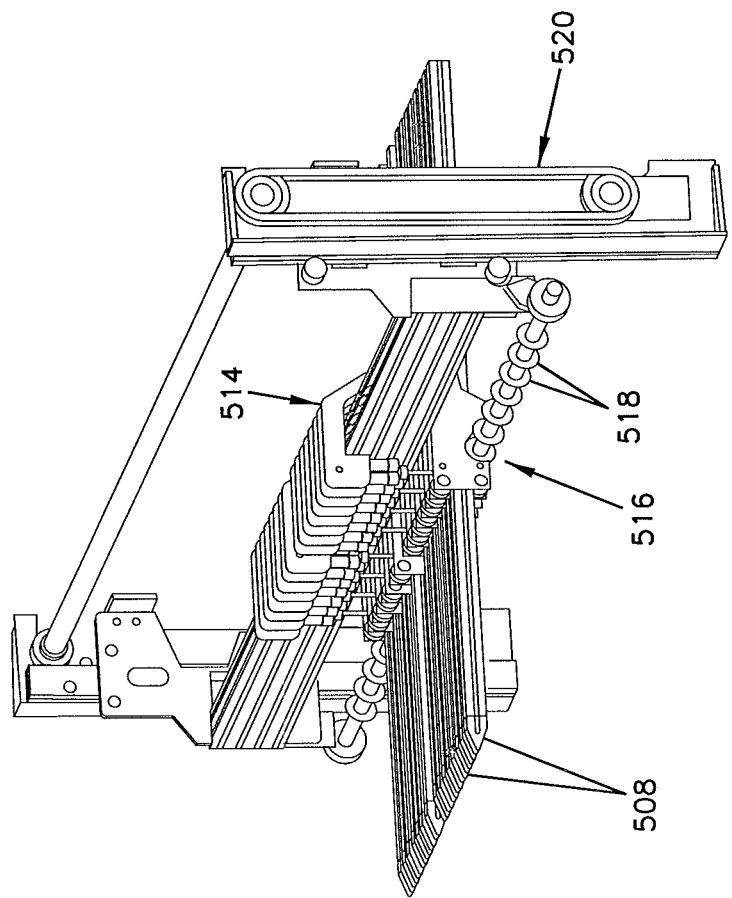
FIG. 5 is a perspective view of batch forks of an apparatus for stacking corrugated sheet material in accordance with an embodiment of the present disclosure.

With reference to FIG. 2, the stacking section 106 may include a stacking apparatus 500, lift forks 502, and pusher forks 504. With reference additionally to FIG. 5, the stacking apparatus 500 may include a backstop 506 and one or more batch or separator forks 508.

In some embodiments, the backstop 506 may be formed of a thin plate material or a plurality of sections of a thin plate material or tubes. The backstop 506 may generally be oriented vertically and assists in generally aligning the leading edge of each blank sheet of material in an accumulated stack substantially vertically coincident with each other. The backstop 506 may include a front face 510 that is engaged by the leading edge of each sheet as it is received from the incline conveyor section 106. In some embodiments, the backstop 506 may be automatically or manually adjusted in the longitudinal and/or vertical directions with respect to the remaining elements of the stacking apparatus 500.

In further embodiments, the stacking section 106 may include a back tamper 512, which can oscillate in a generally horizontal path and tamp the sheets of material in the accumulated stack so as to condition each blank with respect to the backstop 506. In addition, the stacking apparatus 500 may include an additional conditioning assembly, which may include side tampers and/or bundle dividers. The side tampers and/or bundle dividers may separate the received sheets of material into individual bundles and may condition the separated bundles. That is, the side tampers and/or bundle dividers may maintain separation between laterally adjacent sheets, such as where the sheets are received from the incline conveyor in side-by-side fashion, as they are being stacked. For example only, if there are three side-by-side sheets forming three side-by-side bundles at the stacking apparatus 500, then two dividers may be utilized to separate the middle stack from the two outside stacks. In one embodiment, the tampers may be pneumatically actuated; however, other means of actuation are contemplated by this disclosure. In one embodiment, the dividers may be individually or gang adjustable in the conveying direction and independently adjustable in the transverse direction. The dividers may be automatically or manually adjustable.

As the sheets of material are received from the incline conveyor section 106 and delivered to the stacking apparatus 500, the sheets of material may form stacks supported initially by the batch or separator forks 508. In one embodiment, the batch forks 508 may be a plurality of longitudinal members or fork-like tines configured for supporting the sheets of material as they are accumulated into bundles. In one embodiment, the batch forks 508 may be adjusted, automatically or manually, laterally with respect to one another at any suitable spacing interval, and may be spaced evenly or unevenly with respect to one another. In one embodiment, the batch forks 508 may be laterally spaced by means of a guide rail system 514; however, any means for laterally spacing the batch forks with respect to one another is suitable.

With reference particularly to FIGS. 2 and 6A, the stacking apparatus 500, including the backstop 506 and batch forks 508, may move in a longitudinal direction. As such, the stacking apparatus 500 may be positioned and set up appropriately to accommodate any suitable length of sheets received from the incline conveyor section 106. In one embodiment, the stacking apparatus 500 may be moved by means of a longitudinal positioning system, discussed in more detail below with reference to machine set up and maintenance.

In addition to the longitudinal movement of the stacking apparatus 500, the batch forks 508 themselves may also be moved horizontally and vertically with respect to the rest of the stacking apparatus. As illustrated in FIGS. 2 and 6B, for example, the batch forks 508 may be moved any suitable amount longitudinally, toward or away from the incline conveyor section 106. In one embodiment, the longitudinal movement of the batch forks 508 may be limited only by the length of the batch forks. Longitudinal movement of the batch forks 508 may be achieved using any suitable means. In one embodiment, as illustrated in FIG. 5, the batch forks 508 may be moved longitudinally by means of a rack and pinion gear rack system 516. In this manner, rotational movement of spur gears 518 can be translated to linear movement of the batch forks 508.

Additionally, as illustrated in FIGS. 6B and 6C, the batch forks 508 may also be moved any suitable amount in a vertical direction as permitted by the stacking apparatus 500. Vertical movement of the batch forks 508 may be achieved using any suitable means. In one embodiment, as illustrated in FIG. 5, the batch forks 508 may be moved vertically by means of a vertical track system 520. In one embodiment, the vertical track system 520 may comprise a chain or belt drive system driven by a motor, such as but not limited to a servo motor, as would be understood by one skilled in the art. Of course, as illustrated in FIG. 6D, for example, the batch forks 508 may be moved longitudinally and vertically in any suitable combination.

Figure 7:
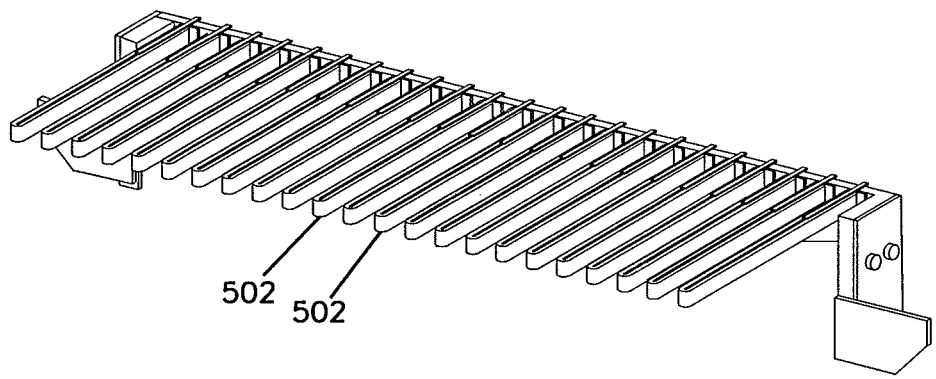
FIG. 7 is a perspective view of lift forks of an apparatus for stacking corrugated sheet material in accordance with an embodiment of the present disclosure.

Once a desired number of sheets of material received from the incline conveyor section 106 has accumulated on the batch forks 508, the batch forks may transfer the accumulated bundles to the lift forks 502. Similar to the batch forks 508, the lift forks 502 may be a plurality of laterally spaced longitudinal members or fork-like tines configured for supporting the sheets of material in bundles, as shown in FIG. 7. While in one embodiment, the spacing of the longitudinal members may be fixed and even, it is contemplated by the present disclosure that such spacing of the longitudinal members may also be automatically or manually adjusted and that the spacing may be even or uneven.

With reference particularly to FIGS. 2 and 9A, the lift forks 502, may also move longitudinally. As such, the lift forks 502 may be positioned and set up appropriately to accommodate any suitable length of sheets transferred from the batch forks 508. In one embodiment, the lift forks 502 may be moved by means of a longitudinal positioning system, discussed in more detail below with reference to machine set up and maintenance.

Additionally, as illustrated in FIGS. 2 and 9B, the lift forks 502 may be moved any suitable amount in a vertical direction, space permitting. Vertical movement of the lift forks 502 may be achieved using any suitable means. In one embodiment, as illustrated in FIGS. 9A-B, the lift forks 502 may be moved vertically by means of a vertical track system 900. In one embodiment, the vertical track system 900 may comprise a chain or belt drive system driven by a motor, such as but not limited to a servo motor, as would be understood by one skilled in the art. Of course, as can be appreciated from FIGS. 2 and 9A-B, for example, the lift forks 502 may be moved longitudinally and vertically in any suitable combination.

The batch forks 508 and the lift forks 502 may be generally spaced such that the lift forks 502 are permitted to align with or pass by the batch forks 508 in the vertical direction. That is, the lift forks 502 may be spaced such that they fit within the spacing between the batch forks 508. In this regard, the lift forks 502 may receive the bundles from the batch forks 508 directly through vertical alignment of the lift forks and batch forks. The batch forks 508 can then be moved longitudinally, as discussed above, away from the bundles, thereby transferring the bundles to the lift forks 502, as will be discussed in further detail below.

The lift forks 502 may then index down while the bundles are being completed, then lower the bundles to an appropriate height where pusher forks 504 can push the bundles out of the stacking section 108 downstream to the bundle accumulation section 110. In order to determine when a bundle is complete and ready to exit the stacking section 108, one or more sensors and corresponding processing components for counting the number of sheets being stacked in a bundle may be provided. While such sensors, or sheet counter, may be provided in generally any section up to and including the stacking section 108, in some embodiments, the sensors, or sheet counter, may be most desirably located at the rotary die cutter 102, or in the incline conveyor section 106 or stacking section, where the sensors can detect the sheets as they are passed to or stacked on the batch forks 508 and/or lift forks 502. In other embodiments, however, other methods may be used to determine or indicate when a bundle is complete, such as but not limited to, by a timer that permits a bundle to accumulate for a set amount of time, or by a user manually indicating bundle completion, such as by pushing a button.

Figure 8:
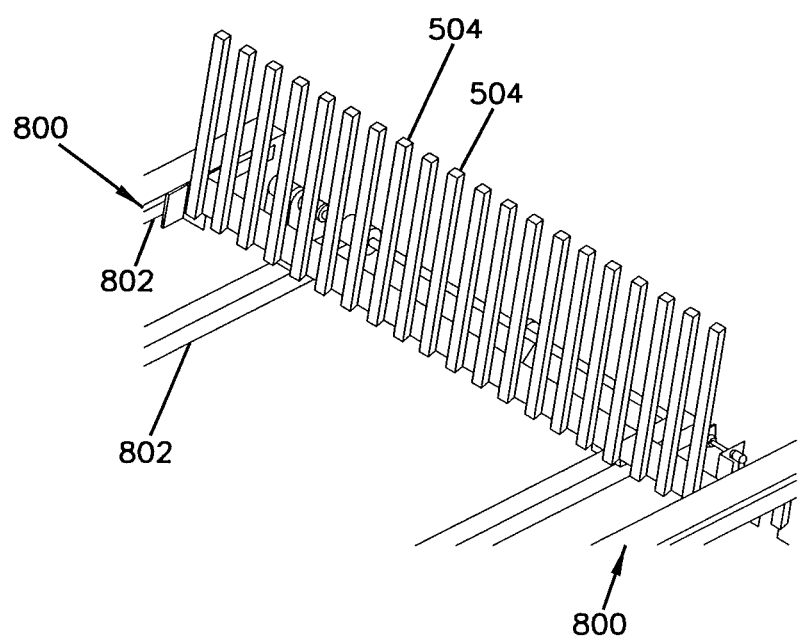
FIG. 8 is a perspective view of pusher forks of an apparatus for stacking corrugated sheet material in accordance with an embodiment of the present disclosure.

As illustrated in FIG. 8, pusher forks 504 may be a plurality of laterally spaced substantially vertical members or fork-like tines. While in one embodiment, the spacing of the vertical members may be fixed and even, it is contemplated by the present disclosure that such spacing of the vertical members may also be automatically or manually adjusted and that the spacing may be even or uneven. In one embodiment, the vertical members may have a height equal to or greater than the height of any bundle formed by the stacking apparatus 500. However, any other suitable height of the vertical members is contemplated by the present disclosure.

Figure 9C:
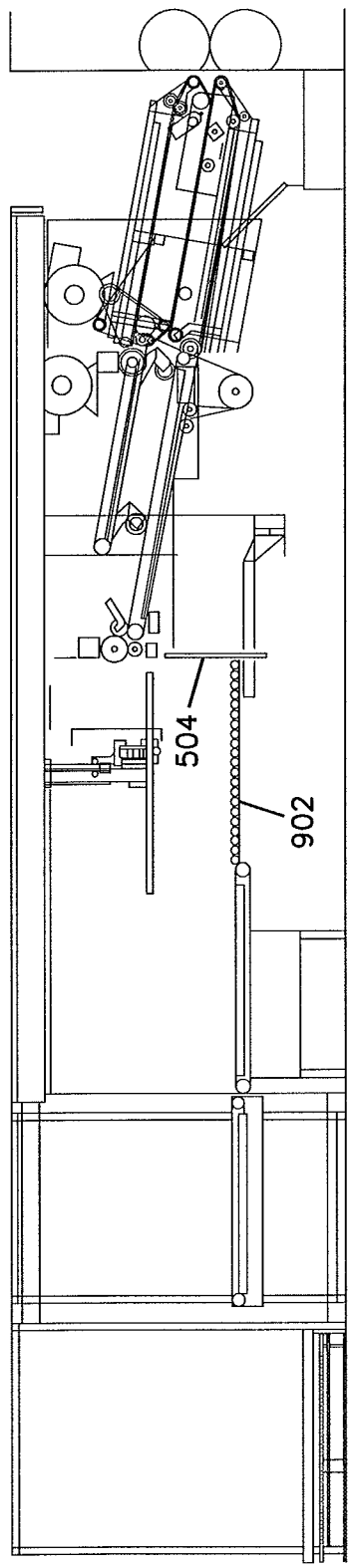
FIGS. 9C-D are side schematic views illustrating movement of pusher forks of an apparatus for stacking corrugated sheet material in accordance with an embodiment of the present disclosure.
Figure 9D:
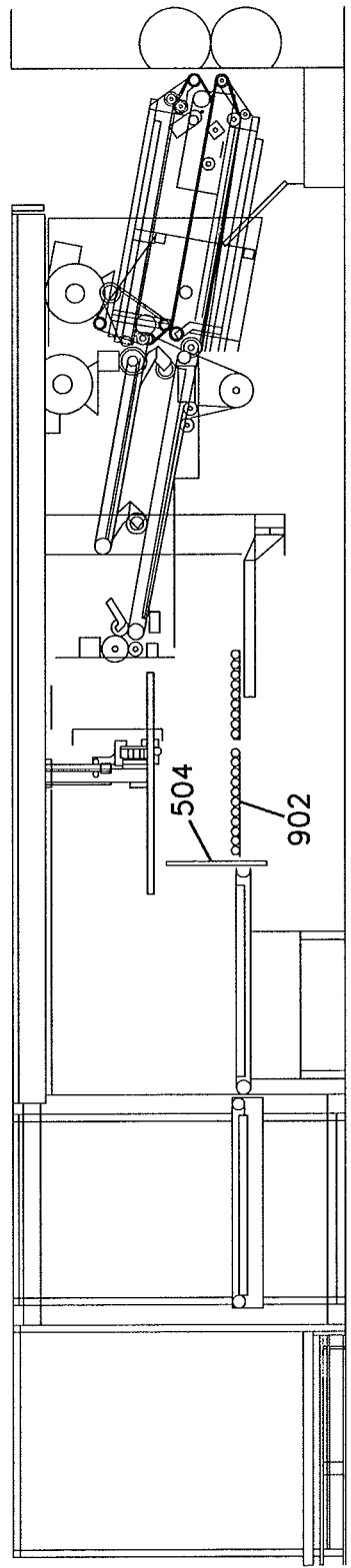

With reference particularly to FIGS. 2 and 9C-D, the pusher forks 504, may move longitudinally in the conveying direction. As shown in FIG. 8, in one embodiment, the pusher forks 504 may be moved along rails or side frames 800, which may include a linear track and/or conveyor system 802. In one embodiment, the linear track and/or conveyor system 802 may comprise a chain or belt drive system driven by a motor, such as but not limited to a servo motor, as would be understood by one skilled in the art.

The pusher forks 504 may be generally spaced such that they are permitted to fit between, or pass through or within, the spacing between the lift forks 502. In this regard, the pusher forks 504 can push, or otherwise cause a transfer, of bundles at a resting position on the lift forks 502 to or toward the exit of the stacking section 108 and the bundle accumulation section 110, as will be discussed in further detail below. In some embodiments, as shown in FIGS. 9C and 9D, the stacking section 108 may also include a conveyor means 902 longitudinally positioned between the lift forks 502 and the exit of the stacking section 108. Conveyor means 902 may be any suitable driven or non-driven conveyor means, such as but not limited to a driven belt conveyor or a non-driven roller conveyor, as shown for example in FIG. 1.

Generally, the bundle accumulation section 110 comprises a bundle accumulation conveyor, which can receive the bundles from the stacking section 108, or more particularly, the pusher forks 504 and/or conveyor means 902 and transfer them to a stack building and palletizing zone 112, shown in FIG. 1, or to a separate exit and onto other process flow equipment.

The stacking apparatus 100 may also include one or more controllers 120 that may be accessed by an operator and may generally control operation of the stacking apparatus, including but not limited to, operation of the takeaway conveyor 300, incline conveyor 402, stacking apparatus 500, lift forks 502, and pusher forks 504, and each of the various components thereof. The controller(s) 120 may communicate parameters and diagnostics of the stacking apparatus 100 to an operator. The controller(s) 120 may also communicate with other machinery in the process line with the stacking apparatus 100. The controller(s) 120 may include both hardware and software components. More particularly, controller(s) 120 may include a main memory, one or more mass storage devices, a processor, one or more input devices, and one or more output devices. The main memory may include random access memory (RAM), read-only memory (ROM), or similar types of memory. One or more programs or applications may be stored in one or more of the main memory or mass storage devices. Programs or applications may be loaded in part or in whole into the main memory or the processor during execution by the processor. The mass storage devices may include, but are not limited to, hard disk drives, floppy disk drives, CD-ROM drives, smart drives, flash drives, or other types of non-volatile data storage, a plurality of storage devices, or any combination of storage devices. The processor may execute applications or programs to run the stacking apparatus 100 of the present disclosure, or portions thereof, stored as executable programs or program code in the memory or mass storage devices, or received from the Internet or other network. The input devices may include any device for entering information into the controller(s) 120, such as but not limited to, a microphone, digital camera, video recorder or camcorder, keys, keyboard, mouse, cursor-control device, touch-tone telephone or touch-screen, a plurality of input devices, or any combination of input devices. The output devices may include any type of device for presenting information to a user, including but not limited to, a computer monitor or flat-screen display, a printer, speakers or any device for providing information in audio form, a plurality of output devices, or any combination of output devices.

Figure 10A:
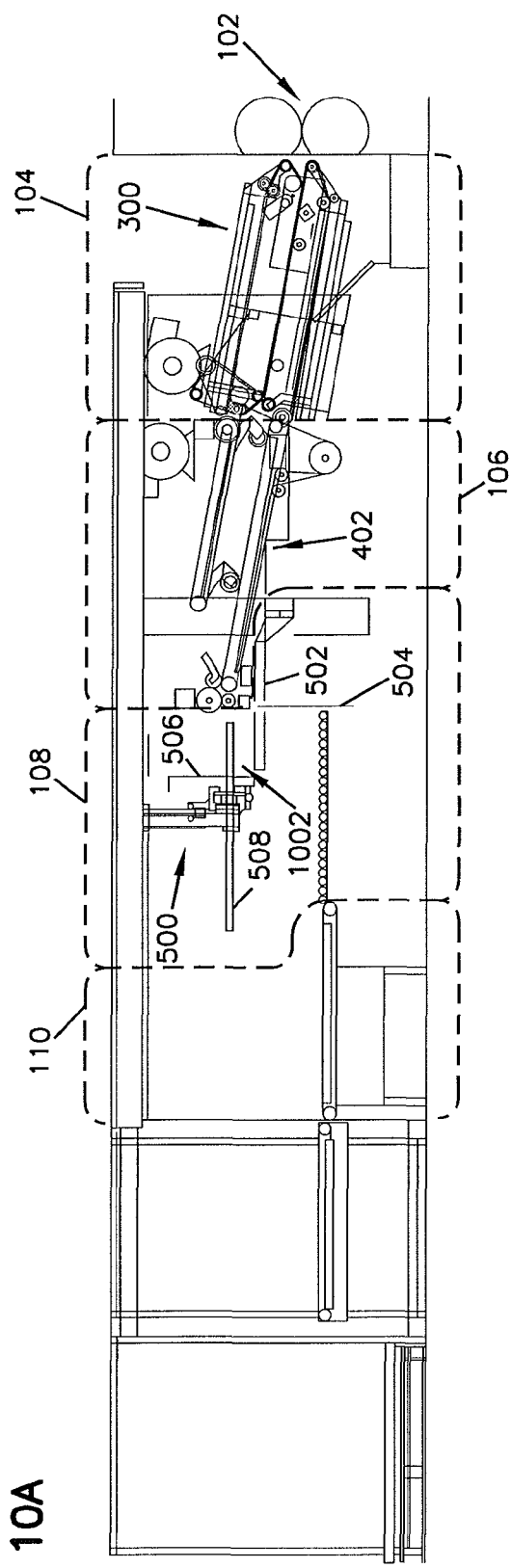

Operation of the system, and a method aspect, of the present disclosure can be understood and described as follows with reference to FIGS. 10A to 10G. As with FIG. 2, process flow through the apparatus, also referred to herein as the conveying direction, is from right to left in FIGS. 10A to 10G. With reference first to FIG. 10A, sheets of material may initially be received by the trim section 104 from the outfeed of a previous apparatus capable of feeding sheet material, such as but not limited to a rotary die cutter 102. In one embodiment of the stacking apparatus 100, the sheet material is received from the rotary die cutter 102 by the trim section 104. Within the trim section 104, trim or scrap pieces of material may be removed from the sheet material and is desirably permitted to fall away or forced away from the remaining sheet material so that it does not become trapped in the stacking apparatus, potentially causing severe run time issues. As discussed above, in embodiments where the sheet material is received by the trim section 104 in side-by-side rows, the trim section 104 may also laterally separate the side-by-side rows.

The sheets of material, or blanks, may then be transported to the end of the trim section 104 and delivered to the incline conveyor section 106. As discussed above, the incline conveyor section 106 may receive the sheets of material from the trim section 104 at a first position and move the sheets upward to an elevated position for discharging to the stacking section 108. In some embodiments, as described in detail above, the incline conveyor section 106 may include a means or device for decelerating the sheets of material as they are delivered to the stacking section 108. The incline conveyor section 106 may generally deliver the sheets of material to the stacking section 108 in individual, single-file order, or in single-file rows of side-by-side, separated sheets.

Figure 10B:
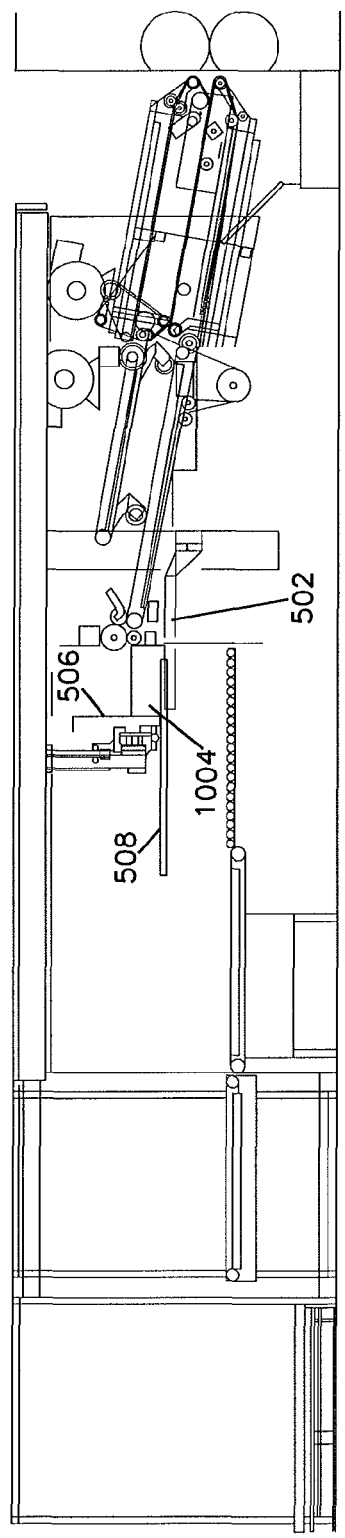

In the stacking section 108, the stacking apparatus 500 may be generally set up such that the stacking apparatus 500 is appropriately positioned longitudinally for receiving the length of the sheets being delivered by the incline conveyor section 106. The stacking section 108 may generally begin receiving the sheets of material or rows of side-by-side, separated sheets with the batch forks 508 generally in an initial sheet receiving position 1002, as shown in FIG. 10A. In this position, the batch forks 508 are ready to receive the sheets of material from the incline conveyor section 106 as they are delivered toward the backstop 506 and fall onto the batch forks for stacking in a stack 1004, as shown in FIG. 10B. As also illustrated in FIG. 10B, as more sheets of material are received by the batch forks 508 from the incline conveyor section 106, the batch forks may automatically index, step, or otherwise move in a downward direction so as to keep from blocking the incoming sheets from the incline conveyor section. The downward movement may also be configured at a rate so as to maintain a constant height of drop onto the stack 1004 from the incline conveyor section 106.

Figure 10E:
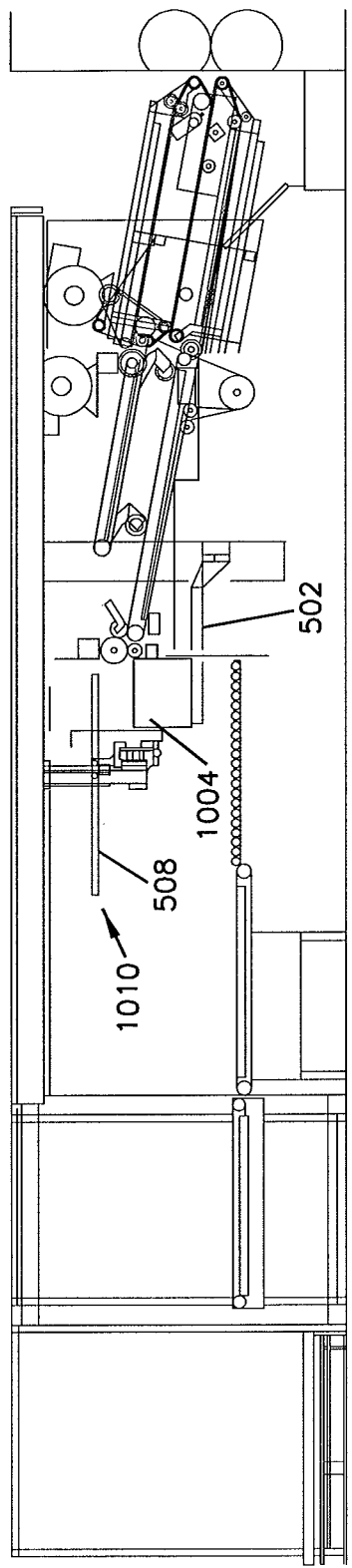

Initially, the load of the stack of sheets 1004 may be supported by the batch forks 508. However, as illustrated in FIG. 10B, as the stack grows and the batch forks 508 move in a downward direction toward the lift forks 502, the batch forks ultimately pass within the lift forks, as described above, thereby transferring the load of the stack 1004 to the lift forks. With the load transferred to the lift forks 502, the batch forks 508 may move in a longitudinal direction downstream, and out of the way from, the stack of sheets 1004 into an initial resetting position 1006, as illustrated in FIG. 10C. Similar to the batch forks 508, as more sheets of material are received from the incline conveyor section 106, the lift forks 502 may automatically index, step, or otherwise move in a downward direction so as to keep from blocking the incoming sheets from the incline conveyor section. While the lift forks 502 continue the stack building process, the batch forks 508 may move from the initial resetting position 1006 vertically to a stack clearing position 1008, as illustrated in FIG. 10D. From there, the batch forks 508 are free to move longitudinally in the upstream direction without being obstructed by the stack forming on the lift forks 502 into an above stack position 1010, as illustrated in FIG. 10E.

As described above, some embodiments of the stacking section 106 may include a back tamper 512, which can oscillate in a generally horizontal path and tamp the sheets of material in the accumulated stack so as to condition each blank with respect to the backstop 506. In addition, the stacking apparatus 500 may include an additional conditioning assembly, which may include side tampers and/or bundle dividers. The side tampers and/or bundle dividers may separate the received sheets of material into individual bundles and may condition the separated bundles as they are being formed on the batch forks 508 and/or lift forks 502.

Figure 10F:
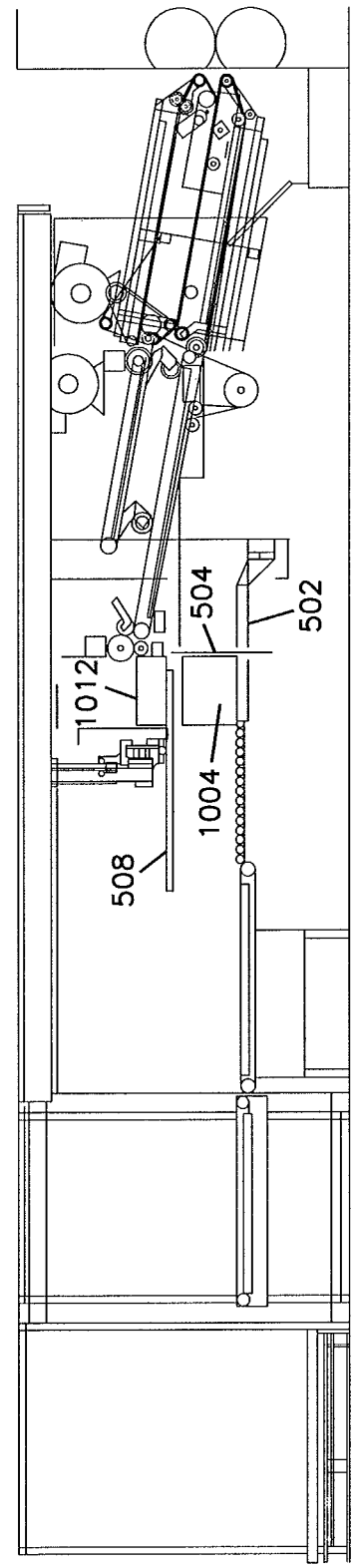
Figure 10G:
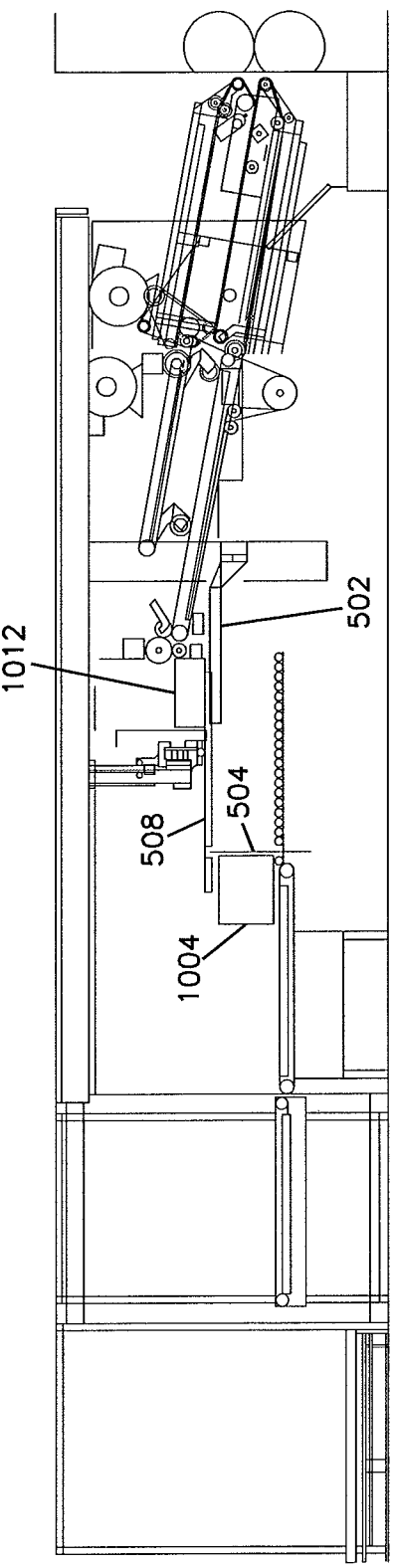

As also described above, one or more sensors and corresponding processing components for counting the number of sheets being stacked may be provided to determine when a bundle is complete and ready to exit the stacking section 108. At or about the time when the stack counter has determined that the desired number of sheets has accumulated in the bundle 1004 supported by the lift forks 502, the batch forks 508 may complete the resetting cycle by moving downward from the above stack position 1010 back toward and into the initial sheet receiving position 1002, so that the batch forks can again take over the task of receiving the incoming sheets from the incline conveyor section 106 to begin building another stack 1012 separate from the stack 1004 supported by the lift forks 502, as illustrated in FIG. 10F. At or about the same time, the lift forks 502 may continue lowering the bundle 1004 to an appropriate height where pusher forks 504 can push the bundle out of the stacking section 108 downstream to the bundle accumulation section 110, as illustrated in FIG. 10G. Once the pusher forks 504 have pushed the bundle 1004 away from the lift forks 502, the lift forks 502 can move back upward toward the batch forks 508, so that the lift forks can once again take over the stack building task from the batch forks, as described above.

After receipt of the bundle 1004 from the stacking section 108, the bundle accumulation section 110 may transfer the bundle to a stack building and palletizing zone 112 or to a separate exit and onto other process flow equipment as may be desirable for that particular bundle.

As mentioned above, one advantage of the various embodiments of stacking apparatus 100 of the present disclosure is that they permit sections or portions of the apparatus to open up and generally allow access to many or all of the necessary parts for operation. This can facilitate set-up of the machine for each sheet configuration delivered, for example, by the rotary die cutter 102, and can also facilitate recovery from jams, cleaning, and maintenance. In one embodiment, each of these tasks can typically be performed without the necessity of an operator climbing up and onto the apparatus.

Figure 11A:
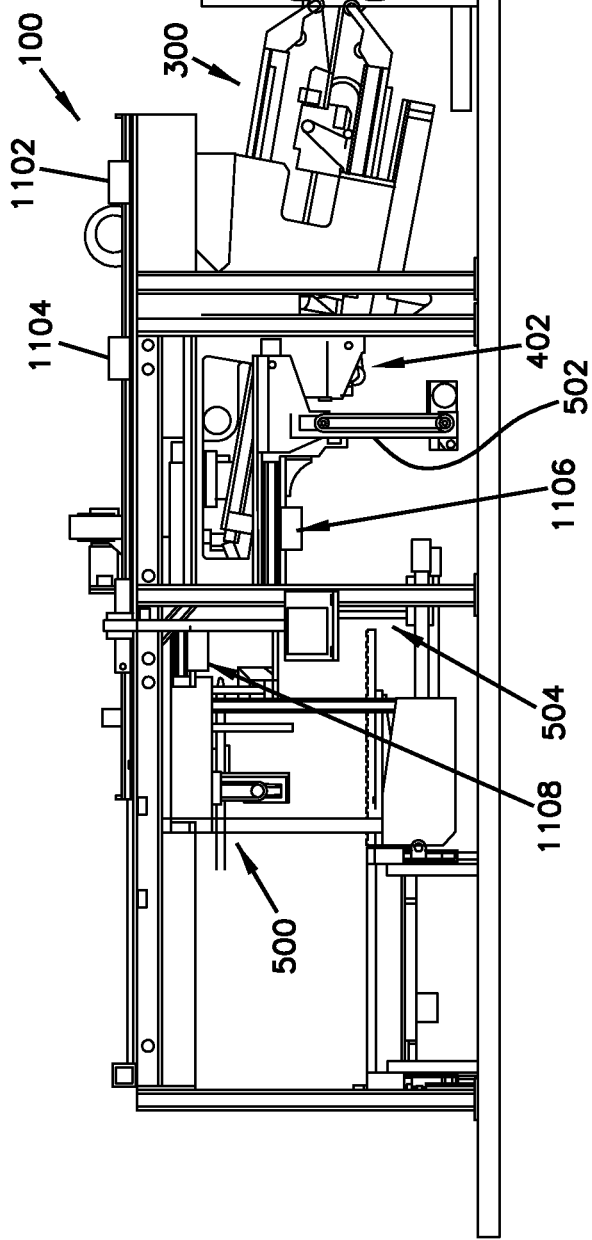
FIG. 11A is a side schematic view of an apparatus for stacking corrugated sheet material in accordance with an embodiment of the present disclosure with the longitudinal positioning systems actuated to place the various components of the apparatus in generally operational positions.

FIGS. 11A to 11E illustrate one embodiment of a stacking apparatus 100 with the various above-described components in various positions permitting safe and easy access to many or all of the necessary parts for operation in order to facilitate set-up, recovery from jams, and cleaning and maintenance. FIG. 11A illustrates the stacking apparatus 100 in generally an operation position, with each of the various components, such as but not limited to the takeaway conveyor 300, incline conveyor 402, stacking apparatus 500, lift forks 502, and pusher forks 504 in their generally operational positions. However, the stacking apparatus 100 may include a plurality of longitudinal positioning systems which permit longitudinal positioning of several of the various above-described components. The longitudinal positioning systems may include any suitable means for providing longitudinal motion of an attached component, such as but not limited to hydraulic or pneumatic systems, electric motors, pistons and/or actuators, rail systems, rack and pinion gearing systems or other gearing systems, rollers, etc., or any combination of means for providing longitudinal motion of an attached component.

As illustrated in FIG. 11A, the takeaway conveyor 300, in one embodiment for example, may be longitudinally positioned by means of a longitudinal positioning system 1102, which may be seen clearer in FIG. 1. The longitudinal positioning system 1102 may permit longitudinal movement of the takeaway conveyor 300 toward and away from the rotary die cutter 102. In further embodiments, the incline conveyor 402 may also be longitudinally positioned by means of a longitudinal positioning system 1104, which also may be seen clearer in FIG. 1. The longitudinal positioning system 1104 may permit longitudinal movement of the incline conveyor 402 toward and away from the takeaway conveyor 300, or more generally, toward and away from the rotary die cutter 102. In still further embodiments, the lift forks 502 may be longitudinally positioned by means of a longitudinal positioning system 1106. The longitudinal positioning system 1106 may permit longitudinal movement of the lift forks 502 as illustrated generally in FIGS. 9A and 9C. In some embodiments, as illustrated in FIG. 11A, the longitudinal positioning system 1106 of the lift forks 502 may be operably connected with the incline conveyor 402 and, thus, may move therewith. That is, the lift forks 502 may be longitudinally positioned by means of a combination of the longitudinal positioning systems 1104 and 1106. While such combination of longitudinal positioning systems has been described and illustrated with respect to the lift forks 502, it is recognized that longitudinal movement of any of the various components of the stacking apparatus 100 may be achieved by means of a combination of two or more longitudinal positioning systems. In further embodiments, the stacking apparatus 500 may be longitudinally positioned by means of a longitudinal positioning system 1108, which may be seen clearer in FIG. 1. The longitudinal positioning system 1108 may permit longitudinal movement of the stacking apparatus as illustrated generally in FIGS. 6A and 6B.

Figure 11B:
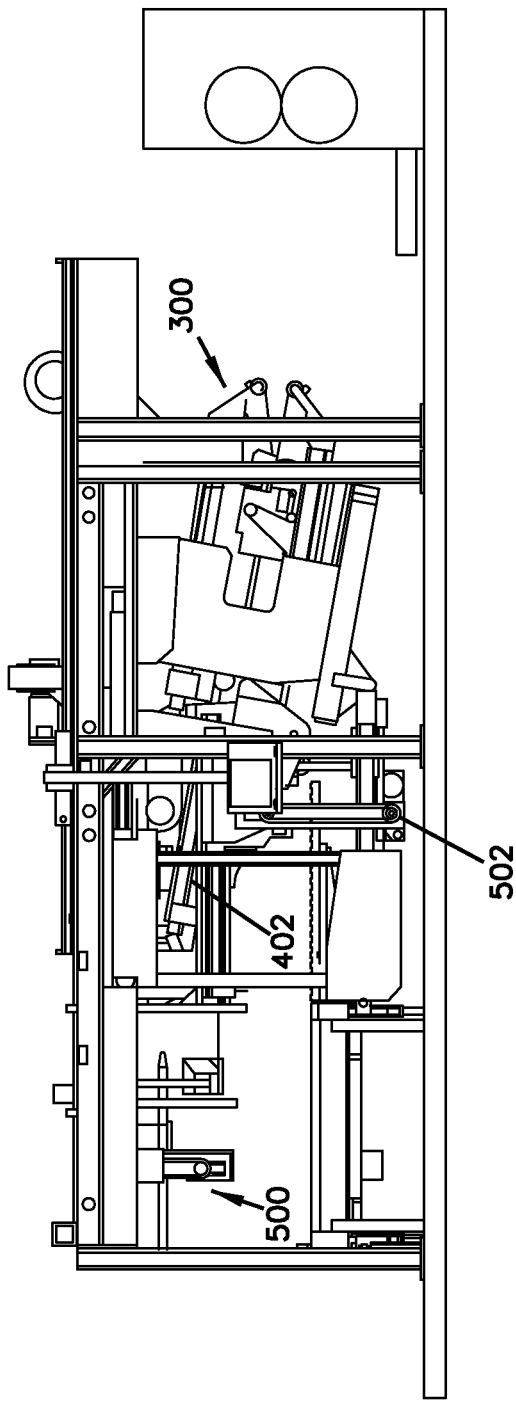
FIG. 11B is a side schematic view of an apparatus for stacking corrugated sheet material in accordance with an embodiment of the present disclosure with the longitudinal positioning systems actuated to provide access space to the converting machine and trim section.

With particular reference to FIG. 11B, the various longitudinal positioning systems may be actuated to provide access to the trim section 104 and/or rotary die cutter or other converting apparatus capable of feeding sheet material. Specifically, the longitudinal positioning systems of the takeaway conveyor 300, incline conveyor 402, and stacking apparatus 500 may be actuated to position the takeaway conveyor 300, incline conveyor 402, and stacking apparatus 500 nearer, or nearest, their most downstream positions. As illustrated in FIG. 11B, the lift forks 502 may be moved downstream by means of the longitudinal positioning system 1104 of the lift forks 502 due to its operable connectivity to the incline conveyor 402. However, in other embodiments, the longitudinal positioning system 1106 may also be actuated to position the lift forks 502 even further downstream. Access to the trim section 104 can permit, among other things, operator access to the rotary die cutters 102, operator access to set-up the takeaway conveyor 300, and operator access for clearing jams or performing maintenance. In some embodiments, longitudinal positioning of the various components of the stacking apparatus in this manner can provide up to six feet of operator access space in the trim section 104. However, it is certainly contemplated that more or less space may be achieved in other embodiments due to various design selections and considerations of the stacking apparatus 100.

With particular reference to FIG. 11C, the various longitudinal positioning systems may be actuated to provide access to the trim section 104 and the incline conveyor section 106. Specifically, the longitudinal positioning system of the takeaway conveyor 300 may be actuated to position the takeaway conveyor 300 nearer, or nearest, its most upstream position toward the rotary die cutter 102. On the other hand, the longitudinal positioning systems of the incline conveyor 402 and stacking apparatus 500 may be actuated to position the incline conveyor 402 and stacking apparatus 500 nearer, or nearest, their most downstream positions. Again, as illustrated in FIG. 11C, the lift forks 502 may be moved downstream by means of the longitudinal positioning system 1104 of the lift forks 502 due to its operable connectivity to the incline conveyor 402. However, in other embodiments, the longitudinal positioning system 1106 may also be actuated to position the lift forks 502 even further downstream. Access to the incline conveyor section 106 can also permit, among other things, operator access to set-up the takeaway conveyor 300 and operator access for clearing jams or performing maintenance. In some embodiments, longitudinal positioning of the various components of the stacking apparatus in this manner can provide up to six feet of operator access space in the incline conveyor section 106. However, it is certainly contemplated that more or less space may be achieved in other embodiments due to various design selections and considerations of the stacking apparatus 100.

With particular reference now to FIG. 11D, the various longitudinal positioning systems may also be actuated to provide split access to more than one section at a time. As an example only, FIG. 11D illustrates split access to the rotary die cutter, trim section 104, and the incline conveyor section 106. However, it is recognized that access space may be split between any combination of apparatus sections where suitable. With reference specifically to FIG. 11D, the longitudinal positioning system of the takeaway conveyor 300 may be actuated to position the takeaway conveyor 300 somewhere between its most upstream and downstream positions. The longitudinal positioning systems of the incline conveyor 402 and stacking apparatus 500 may be actuated to position the incline conveyor 402 and stacking apparatus 500 nearer, or nearest, their most downstream positions. As with FIGS. 11B and 11C, the lift forks 502 may be moved downstream by means of the longitudinal positioning system 1104 of the lift forks 502 due to its operable connectivity to the incline conveyor 402. However, in other embodiments, the longitudinal positioning system 1106 may also be actuated to position the lift forks 502 even further downstream. In some embodiments, longitudinal positioning of the various components of the stacking apparatus in this manner can provide various combinations of access space to the trim section 104 and incline conveyor section 106, such as but not limited to three feet on each side, at the same time. However, it is certainly contemplated that more or less space may be achieved in other embodiments due to various design selections and considerations of the stacking apparatus 100.

Figure 11E:
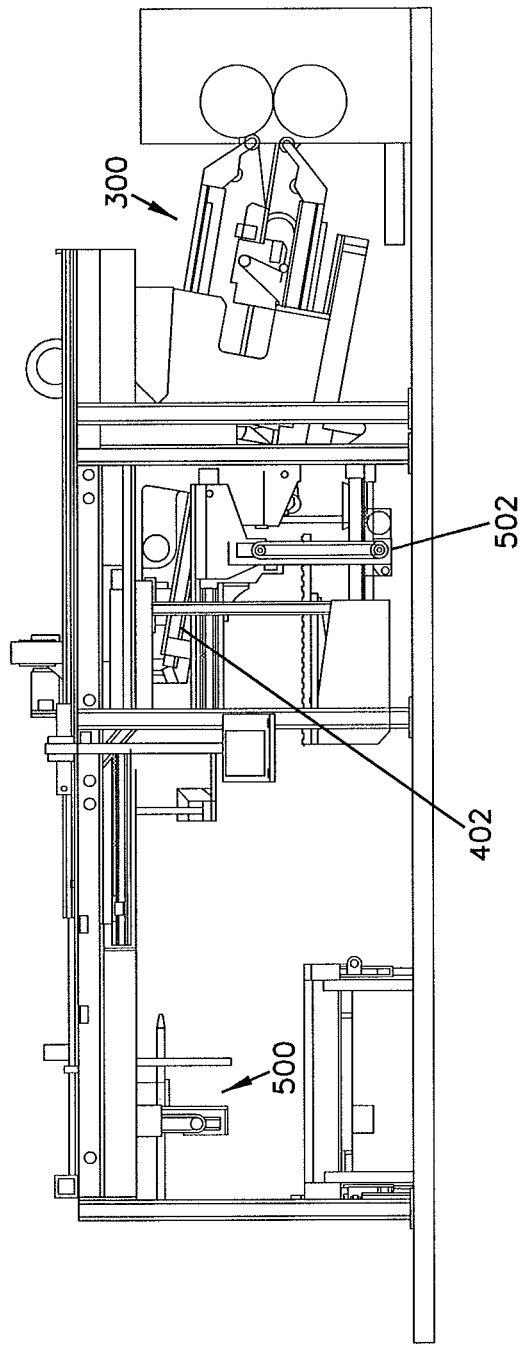
FIG. 11E is a side schematic view of an apparatus for stacking corrugated sheet material in accordance with an embodiment of the present disclosure with the longitudinal positioning systems actuated to provide access space to the stacking section.

With particular reference to FIG. 11E, the various longitudinal positioning systems may be actuated to provide access to the stacking section 108. Specifically, the longitudinal positioning systems of the takeaway conveyor 300 and incline conveyor 402 may be actuated to position the takeaway conveyor 300 and incline conveyor nearer, or nearest, their most upstream positions toward the rotary die cutter 102. On the other hand, the longitudinal positioning system of the stacking apparatus 500 may be actuated to position the stacking apparatus 500 nearer, or nearest, its most downstream position. Again, as illustrated in FIG. 11D, the lift forks 502 may be moved upstream by means of the longitudinal positioning system 1104 of the lift forks 502 due to its operable connectivity to the incline conveyor 402. However, in other embodiments, the longitudinal positioning system 1106 may also be actuated to position the lift forks 502 less upstream. Access to the stacking section 108 can permit, among other things, operator access to set-up the stacking section and operator access for clearing jams or performing maintenance. Set-up for the stacking section 108 may include, but is not limited to, configuring the spacing of the batch forks 508 and configuring the back tamper 512 and any side tampers or bundle dividers. In some embodiments, longitudinal positioning of the various components of the stacking apparatus in this manner can provide up to six feet of operator access space in the stacking section 108. However, it is certainly contemplated that more or less space may be achieved in other embodiments due to various design selections and considerations of the stacking apparatus 100.

FIGS. 11A to 11E illustrate a hanging embodiment of a stacking apparatus 100. However, as described above, in other embodiments the stacking apparatus 100 may be configured generally as a floor mount embodiment, in which several components of the trim section 104, incline conveyor section 106, stacking section 108, and/or bundle accumulation section 110 may have separate support masts or legs rather than being suspended or hung from an overhead support apparatus 114. A floor mount embodiment may also include various longitudinal positioning systems. However, the various longitudinal positioning systems may be positioned in other locations than illustrated in FIGS. 11A to 11E, such as but not limited to, nearer to the floor or support masts.

Although the various embodiments of the present disclosure have been described with reference to preferred embodiments, persons skilled in the art will recognize that changes may be made in form and detail without departing from the spirit and scope of the present disclosure.

We claim:

1. An apparatus for stacking sheet material received from a converting machine, comprising:
a trim section permitting scrap material to fall away from a plurality of blanks of sheet material;
a stacking section, downstream the trim section for receiving the blanks of sheet material and forming bundles each comprising a plurality of blanks and transferring the bundles downstream; and
an overhead support apparatus from which components of at least the trim section and the stacking section are moveably suspended such that the components are independently longitudinally positionable in at least one of upstream and downstream directions so as to create an operator access space between at least two of the components, the overhead support apparatus constraining movement of the components such that the components are movable along a generally longitudinal line defined by the upstream and downstream directions and generally not moveable laterally outward away from the longitudinal line.

2. The apparatus of claim 1, further comprising an incline conveyor section downstream the trim section and upstream the stacking section, the incline conveyor section having an incline conveyor delivering the blanks of sheet material to the stacking section at an elevated height.

3. The apparatus of claim 2, wherein the stacking section comprises a stacking apparatus having a plurality of substantially horizontal batch forks for receiving the blanks of sheet material from the incline conveyor section.

4. The apparatus of claim 3, wherein the stacking section comprises a plurality of substantially horizontal lift forks for receiving bundles from the batch forks, the batch forks and lift forks spaced such that the batch forks and lift forks may substantially align vertically with one another.

5. The apparatus of claim 4, wherein the stacking section comprises a plurality of substantially vertical pusher forks for transferring the bundles away from the lift forks, at least a portion of the pusher forks spaced such that they pass between lift forks.

6. The apparatus of claim 3, wherein the trim section comprises a takeaway conveyor for conveying the plurality of blanks of sheet material to the incline conveyor.

7. The apparatus of claim 1, wherein the overhead support apparatus includes a plurality of longitudinal positioning systems configured to individually longitudinally position the components of at least the trim section and the stacking section in at least one of the upstream and downstream directions.

8. The apparatus of claim 3, further comprising a plurality of support masts supporting the overhead support apparatus, at least one of the takeaway conveyor, incline conveyor, and stacking apparatus being supported from above by the overhead support apparatus.

9. An apparatus for stacking sheet material received from a converting machine, comprising:
    a trim section permitting scrap material to fall away from a plurality of blanks of sheet material;
    a stacking section, downstream the trim section for receiving the blanks of sheet material and forming bundles each comprising a plurality of blanks and transferring the bundles downstream;
    a bundle accumulation section for receiving bundles from the stacking section; and
    an overhead support apparatus from which components of at least the trim section, stacking section, and the bundle accumulation section are moveably suspended such that the components are independently longitudinally positionable in at least one of upstream and downstream directions so as to create an access space for at least one of the components, the overhead support apparatus constraining movement of the components such that the components are movable along a generally longitudinal line defined by the upstream and downstream directions and generally not moveable laterally outward away from the longitudinal line.

10. The apparatus of claim 9, further comprising an incline conveyor section downstream the trim section and upstream the stacking section, the incline conveyor section having an incline conveyor delivering the blanks of sheet material to the stacking section at an elevated height.

11. The apparatus of claim 9, wherein the stacking section comprises a stacking apparatus having a plurality of substantially horizontal batch forks for receiving the blanks of sheet material from the incline conveyor section.

12. The apparatus of claim 11, wherein the stacking section comprises a plurality of substantially horizontal lift forks for receiving bundles from the batch forks, the batch forks and lift forks spaced such that the batch forks and lift forks may substantially align vertically with one another.

13. The apparatus of claim 12, wherein the stacking section comprises a plurality of substantially vertical pusher forks for transferring the bundles away from the lift forks, at least a portion of the pusher forks spaced such that they pass between lift forks.

14. The apparatus of claim 11, wherein the trim section comprises a takeaway conveyor for conveying the plurality of blanks of sheet material to the incline conveyor.

15. The apparatus of claim 14, wherein the overhead support apparatus includes a plurality of longitudinal positioning systems configured to individually longitudinally position the components of at least the trim section, the stacking section, and the bundle accumulation section in at least one of the upstream and downstream directions.

16. The apparatus of claim 15, further comprising a plurality of support masts supporting the overhead support apparatus, at least one of the takeaway conveyor, incline conveyor, and stacking apparatus being supported from above by the overhead support apparatus.

17. The apparatus of claim 16, wherein the overhead support apparatus comprises a plurality of the longitudinal positioning systems.

18. The apparatus of claim 12, wherein the batch forks are longitudinally and vertically positionable with respect to an upstream infeed by which the stacking apparatus receives the blanks of sheet material.

19. A method for creating operator access space for an apparatus for stacking sheet material comprising one or more sections for forming bundles of blanks of sheet material and conveying the bundles downstream, the method comprising:
    providing an overhead support apparatus from which a plurality of components of the one or more sections are moveably suspended such that the components are independently longitudinally positionable in at least one of upstream and downstream directions so as to create an access space for at least one of the components by which an operator can access the at least one component for at least one of setting up the component, recovering from a jam at the component, cleaning of the component, and maintenance of the component, the overhead support apparatus constraining movement of the components such that the components are movable along a generally longitudinal line defined by the upstream and downstream directions and generally not moveable laterally outward away from the longitudinal line.

20. The method of claim 19, further comprising providing a plurality of longitudinal positioning systems in association with the overhead support apparatus, the plurality of longitudinal positioning systems configured to individually longitudinally position the components in at least one of the upstream and downstream directions.

21. The apparatus of claim 1, wherein the trim section includes a belt conveyer for conveying away the scrap material that falls from the plurality of blanks of sheet material.

22. The apparatus of claim 1, wherein the takeaway conveyer is operated at a line speed that is faster than a speed of the converting machine such that the blanks of sheet material are longitudinally separated in the downstream direction.

* * * * *